(12) United States Patent
Christmas et al.

(10) Patent No.: US 11,921,207 B2
(45) Date of Patent: Mar. 5, 2024

(54) HOLOGRAPHIC LIGHT DETECTION AND RANGING

(71) Applicant: Envisics Ltd, Milton Keynes (GB)

(72) Inventors: Jamieson Christmas, Milton Keynes (GB); Paul Whiting, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 670 days.

(21) Appl. No.: 16/759,963

(22) PCT Filed: May 14, 2019

(86) PCT No.: PCT/EP2019/062373
§ 371 (c)(1),
(2) Date: Apr. 28, 2020

(87) PCT Pub. No.: WO2019/224052
PCT Pub. Date: Nov. 28, 2019

(65) Prior Publication Data
US 2021/0072379 A1 Mar. 11, 2021

(30) Foreign Application Priority Data
May 25, 2018 (GB) .................................. 18086231

(51) Int. Cl.
*G01S 17/10* (2020.01)
*B60Q 1/00* (2006.01)
(Continued)

(52) U.S. Cl.
CPC ............ *G01S 17/10* (2013.01); *B60Q 1/0023* (2013.01); *B60Q 1/04* (2013.01); *G01S 7/4863* (2013.01);
(Continued)

(58) Field of Classification Search
CPC ........ G01S 17/10; G01S 17/46; G01S 7/4863; G01S 7/4865; G01S 17/48
See application file for complete search history.

(56) References Cited

U.S. PATENT DOCUMENTS

2014/0376064 A1* 12/2014 Rosberg ............. G01B 11/2513
358/475
2017/0003392 A1 1/2017 Bartlett et al.
(Continued)

FOREIGN PATENT DOCUMENTS

EP 3165815 5/2017
GB 2560491 A 9/2018
(Continued)

OTHER PUBLICATIONS

International Search Report and Written Opinion for International Application No. PCT/EP2019/062373 dated Jul. 2, 2019, 11 pages.
(Continued)

*Primary Examiner* — Eric L Bolda
(74) *Attorney, Agent, or Firm* — McDonnell Boehnen Hulbert & Berghoff LLP

(57) ABSTRACT

A light detection and ranging system arranged to scan a scene is provided. A light source outputs light having a first characteristic. A spatial light modulator receives output light from the light source and outputs spatially-modulated light in accordance with computer-generated holograms represented thereon. A light detector receives light having the first characteristic from the scene and outputs a light response signal. A holographic controller is arranged to output a plurality of computer-generated holograms to the spatial light modulator. Each computer-generated hologram is arranged to form structured light having a corresponding pattern within the scene. The holographic controller is further arranged to change the pattern of the structured light
(Continued)

formed by at least one of the plurality of computer-generated holograms.

20 Claims, 16 Drawing Sheets

(51) Int. Cl.
    *B60Q 1/04*         (2006.01)
    *G01S 7/4863*    (2020.01)
    *G01S 7/4865*    (2020.01)
    *G01S 17/931*    (2020.01)
    *G03H 1/00*        (2006.01)
    *G03H 1/26*        (2006.01)

(52) U.S. Cl.
    CPC .......... *G01S 7/4865* (2013.01); *G01S 17/931* (2020.01); *G03H 1/0005* (2013.01); *G03H 1/2645* (2013.01); *G03H 2001/0033* (2013.01); *G03H 2001/2655* (2013.01)

(56) References Cited

U.S. PATENT DOCUMENTS

2018/0129166 A1   5/2018  Seo et al.
2019/0004156 A1*  1/2019  Niclass ................. G01S 7/4863

FOREIGN PATENT DOCUMENTS

GB          2561528     10/2018
KR    2018-0052357 A   5/2018

OTHER PUBLICATIONS

UK Search Report for GB Application No. 1808623 dated Nov. 13, 2019, 6 pages.

* cited by examiner

FRAME 1

FRAME 2

FRAME 1

FRAME 2

FRAME 1

FRAME 2

FRAME 1　　　FRAME 2　　　FRAME 3　　　FRAME 4

FRAME 5　　　FRAME 6　　　FRAME 7　　　FRAME 8

FRAME 9　　　FRAME 10　　　FRAME 11　　　FRAME 12

FRAME 13　　　FRAME 14　　　FRAME 15　　　FRAME 16

HOLOGRAPHIC LIGHT DETECTION AND RANGING

CROSS REFERENCE TO RELATED APPLICATIONS

This application is a United States National Stage filing under 35 U.S.C. 371 of International Patent Application no. PCT/EP2019/062373, which claims the benefit of priority of United Kingdom Patent Application no. 1808623.1, filed May 25, 2018.

FIELD

The present disclosure relates to a light projector. More specifically, the present disclosure relates to a holographic projector, holographic projection system, a method of controlling a projector and a method of controlling a holographic projection system. Embodiments relate to a light detection and ranging system. Some embodiments relate to a method of light detection and ranging. Some embodiments relate to a method of controlling the light footprint in a light detection and ranging system. Some embodiments relate to a method of surveying a scene with a computer-controlled light footprint.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example. The holographic projector may be used for light detection and ranging. Light detection ranging systems may be used in a variety of applications including portable devices and vehicles.

The present disclosure is concerned with improvements in light detection and ranging systems. In particular, such improvements may include faster, more reliable and/or more accurate techniques for surveying an area of a scene, in order to detect features of interest, using light detection and ranging.

SUMMARY

Aspects of the present disclosure are defined in the appended independent claims.

There is provided a method of light detection and ranging comprising illuminating a scene with spatially modulated light by outputting a plurality of computer-generated holograms to a spatial light modulator and illuminating the spatial light modulator with light having a first characteristic. Each hologram is arranged to form structured light having a corresponding pattern in a replay field within the scene. In embodiments, the structured light is provided in a light footprint in the replay field. The structured light/light footprint formed by each hologram may have a defined form, shape and/or pattern. The method changes the pattern of the structured light formed in the replay field by at least one of the plurality of computer-generated holograms. The method may also comprise receiving, by a light detector, reflected spatially modulated light having the first characteristic from the scene and outputting a light response signal, wherein the light detector comprises an array of light detecting elements, and an optical system associated with the array of light detecting elements. The optical system is arranged such that each light detecting element (only) receives light from a respective (and unique) sub-area of the replay field within the scene. In embodiments, the method comprises receiving, by each light detecting element, light having the first characteristic from the corresponding (and unique) sub-area of the scene and outputting a respective light response signal.

In some embodiments, the method may be used to dynamically change the size, shape, orientation for and/or pattern of the structured light/light footprint in the replay field within the scene. This is achieved by using dynamic holography to form the structured light/light footprint.

The method may further comprise intelligent scanning or surveying of the scene in which feedback from a light detector is used to determine how and where to perform the next scan or survey. This may comprise selecting at least one computer-generated hologram from a memory or calculating at least one computer-generated hologram including calculating at least one computer-generated hologram in real-time based on a received signal.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator.

The terms "image", "replay image" and "image region" refer to areas of the replay field illuminated by light forming the holographic reconstruction.

The term "light footprint" is generally preferred, in this disclosure, to refer to the illumination pattern formed in the scene by reconstruction of a hologram. Each light footprint corresponds to formation of a holographic reconstruction in the scene. The light footprint is therefore an area of light within the scene (more specifically, within the replay field). The light may be pulsed. The light may have uniform brightness across its area within the replay field. In embodiments, the light may have a non-uniform brightness across its area within the replay field, so as to form a pattern of light in the replay field within the scene. The pattern of light may comprise multiple discrete areas of light (also called "light spots" herein) separated by dark areas, or may be a pattern of light of graded brightness or intensity. Such patterns of light are referred to herein as "structured light". The light footprint/structured light may be characterised by its form, shape and/or pattern. The light detection and ranging system disclosed herein may be used to form a temporal sequence of varying light footprints within a scene. Advantageously, the dynamically-reconfigurable holographic technique disclosed herein may be used to control parameters of the light footprint in real-time. In embodiments, the technique is used to project structured light and change the structured light in real-time. For example, the technique may change the size and/or shape of individual light spots or change the distribution of light spots within the light footprint/structured light formed within the replay field in real-time.

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram.

The terms "scanning" and "surveying" are used synonymously herein to refer to the process of probing an area of a scene by illuminating it with one or more light footprints. Similarly, a "scan" or "survey" comprises a single footprint, or a sequence comprising a plurality of footprints, used in a process of probing an area of a scene.

The term "light" is used herein in its broadest sense. Embodiments are equally applicable to visible light, infrared light and ultraviolet light, and any combination thereof.

Embodiments describe monochromatic light footprints by way of example only. In embodiments, the light footprint is a polychromatic light footprint. In embodiments, a composite colour light footprint is provided by combining a plurality of single colour light footprints. In embodiments, a plurality of single colour computer-generated holograms may be used to form each composite colour light footprint. Such wavelength diversity can increase throughput.

Embodiments describe 1D and 2D light footprints by way of example only. In other embodiments, the light footprint is a 3D light footprint. That is, in embodiments, each computer-generated hologram forms a 3D holographic reconstruction.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

BRIEF DESCRIPTION OF THE DRAWINGS

Specific embodiments are described by way of example only with reference to the following figures:

FIG. 2C illustrates second and subsequent iterations of the example Gerchberg-Saxton type algorithm of an alternative to FIG. 2B;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or such like—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship. Although different embodiments may be disclosed separately in the detailed description which follows, any feature of any embodiment may be combined with any other feature or combination of features of any other embodiment. That is, all possible combinations and permutations of features disclosed are envisaged.

Optical Configuration

Figure 1:
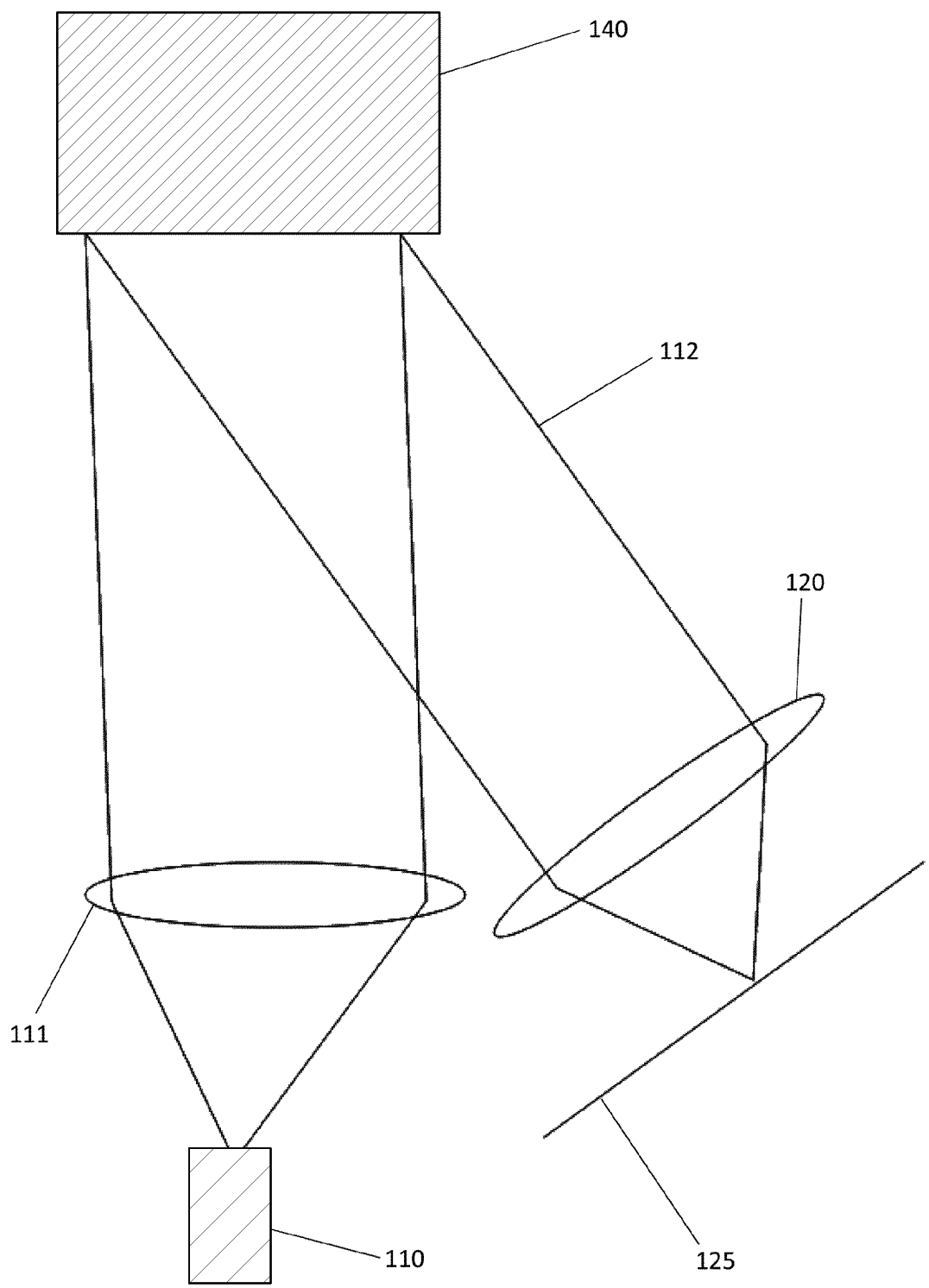
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the optical/dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
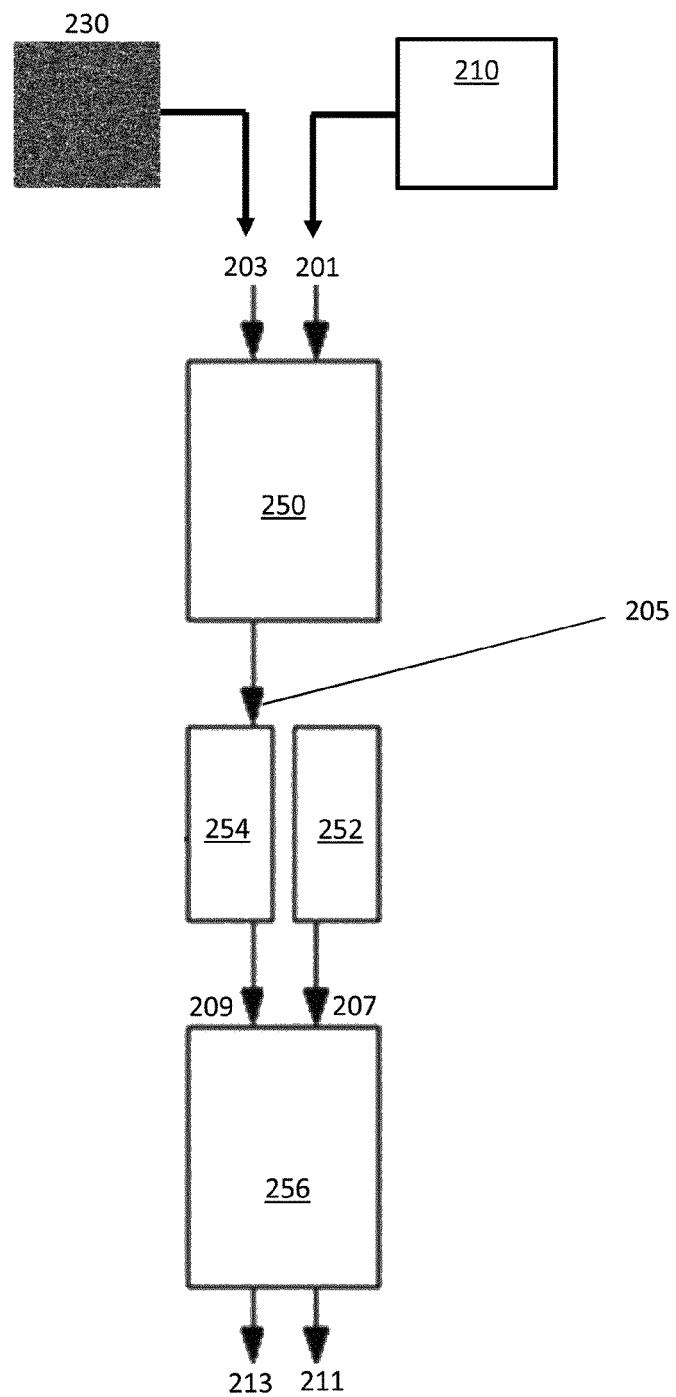
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or pre-set or user-defined.

Figure 2B:
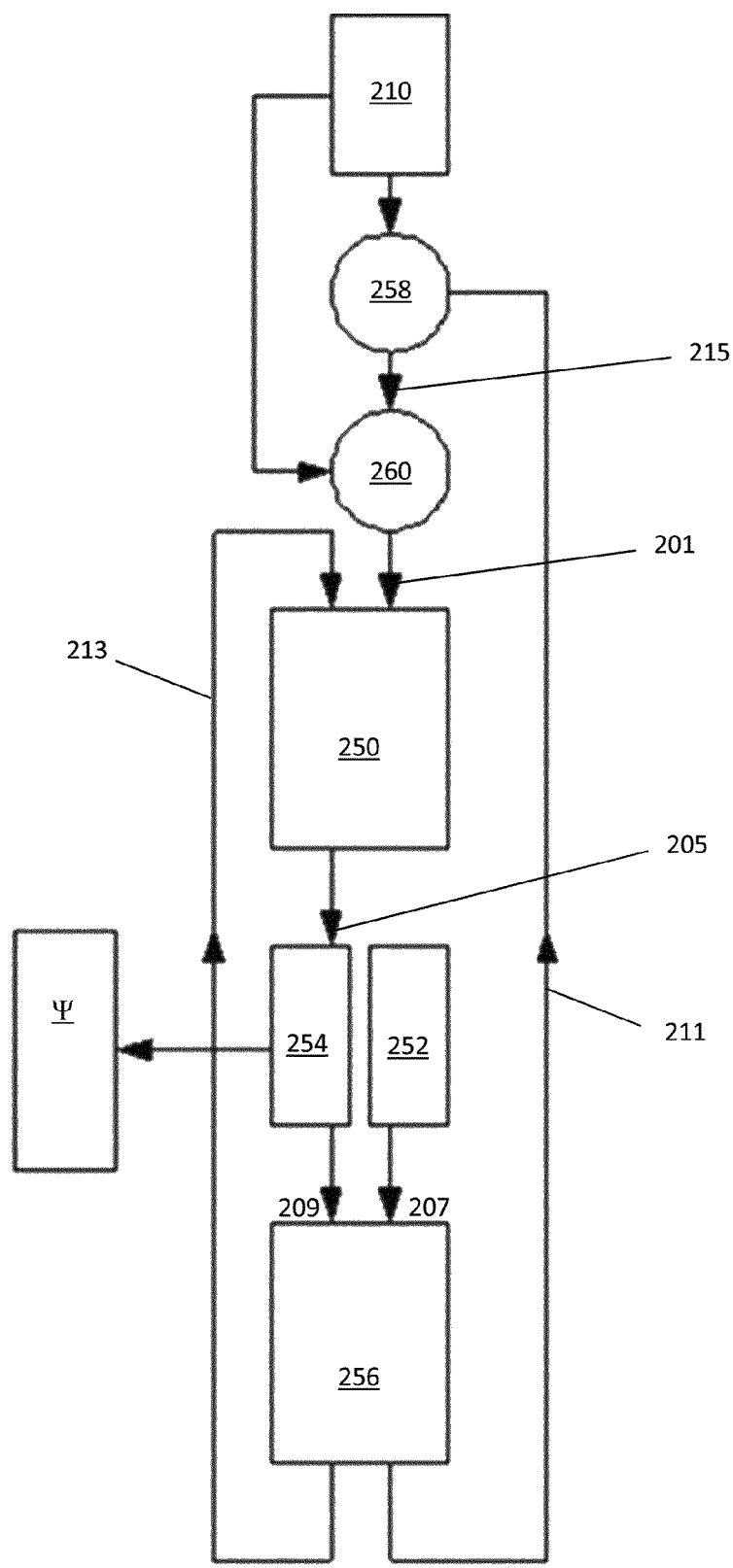
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\ \psi_n[u, v])\}$$

$$\psi_n[u, v] = \angle F\{\eta \cdot \exp(i \angle R_n[x, y])\}$$

$$\eta = T[x, y] - \alpha(|R_n[x, y]| - T[x, y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modeling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
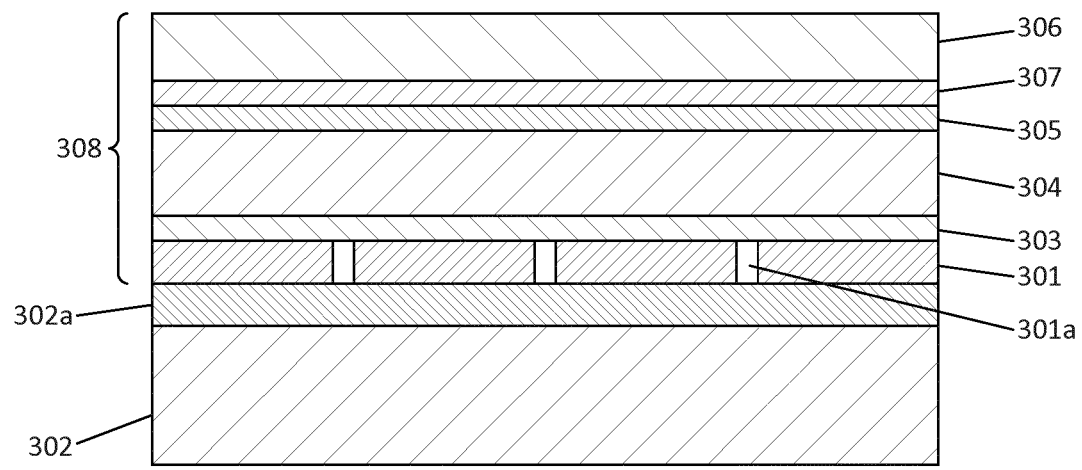
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Light Detection and Ranging ("LiDAR" or "LIDAR") Systems

The inventor has previously disclosed various methods for providing improved image projection using the holographic technique of the present disclosure. The inventor recognised that this holographic technique may also be used to form the basis of an improved LIDAR system. Specifically, the inventor recognised that the technique may be used to scan a holographically-formed light footprint across a scene for LIDAR. For example, the inventor's earlier patent application GB 2,560,491 discloses a scanning LIDAR system, in which a variable grating function (instead of physical optics such as a rotatable prism) is provided to move the replay field (which defines the area where the light footprint is formed in the replay plane) so as to perform a continuous scan of a light footprint across the scene.

In accordance with further advancements disclosed herein, the position of the light footprint within the scene, as well as other parameters of the light footprint such as its form, shape and/or pattern, may be changed by changing the computer-generated hologram. The person skilled in the art of holographic projection will appreciate the distinction between changing the hologram and changing a simple grating function which is mathematically added to the hologram prior to display. The person skilled in the art of holographic projection will also appreciate the distinction between changing the light content of the replay field and moving the (holographic) replay field around the replay plane. In some embodiments, the changes to the computer-generated hologram are made in real-time to facilitate an improve real-time LIDAR system.

In embodiments, the holographic projector is coupled with a light detector having spatial resolution. In embodiments, the holographic projector is used to project a plurality (e.g. an array or pattern) of light spots having a spatial resolution matched (or coordinated with) the spatial resolution of the light detector. It may be understood how such a light detector may be synchronised with the light source and spatial light modulator in order to probe a plurality of points in a scene at the same time with such a plurality of light spots. More specifically, it will be understood that, with suitable synchronisation, a plurality of time-of-flight measurements may be made at the same time. The light has a first characteristic or property, which means it may be distinguished from other light received by the detector. The light may be pulsed and temporally synchronised with the sequence of holograms. In embodiments, the first characteristic or property is amplitude modulation at a first frequency. However, the light may be characterised in any other ways. In embodiments, the first frequency is a radio frequency.

The inventor recognised that by using a light detector comprising an array of light detecting elements arranged to have a one to one correlation with individual sub areas of the replay field within the scene, it is possible to use a computer-generated hologram that forms "structured light"—a pattern of light comprising multiple light features—which may illuminate different areas of the replay field at the same time. Thus, multiple sub areas of the replay field may be surveyed or probed at the same time by means of corresponding light features (e.g. light spots) or "sub footprints" of a light footprint formed by the hologram, in order to improve surveying efficiency. Furthermore, the inventor recognised that by changing the form, shape, size, orientation and/or pattern of the light features or sub footprints formed by consecutive computer-generated holograms in the same replay field, it is possible to derive more detailed information about the replay field area.

In the previously proposed holographic "scanning LIDAR" system, a single light detector is typically used to detect a light return signal from the light footprint. The light footprint remains constant (e.g. in shape, size and form) and typically has a uniform brightness across its area. The position of the light footprint is changed by "beam steering"—e.g. using a grating function—so as to illuminate different areas of the scene, by sequentially and temporally changing the holograms represented on the SLM. In the following embodiments according to the present disclosure, an array detector is used. An array detector is a detector having spatial resolution. Use of an array detector makes is possible to detect multiple light return signals at the same time. A more complex light footprint, for example a light pattern comprising a plurality of light spots or "sub footprints" may be used to illuminate a plurality of points in the scene at the same time. It may be said that the light footprint comprises "structured light". In the following embodiments, the light footprint/structured light is changed by sequentially and temporally changing the holograms represented on the SLM. Importantly, in contrast to the holographic "scanning LIDAR" system, a sequence of two or more holograms represented on the SLM are used to form light footprints/structured light within the same replay field (i.e. without "beam steering").

Figure 4:
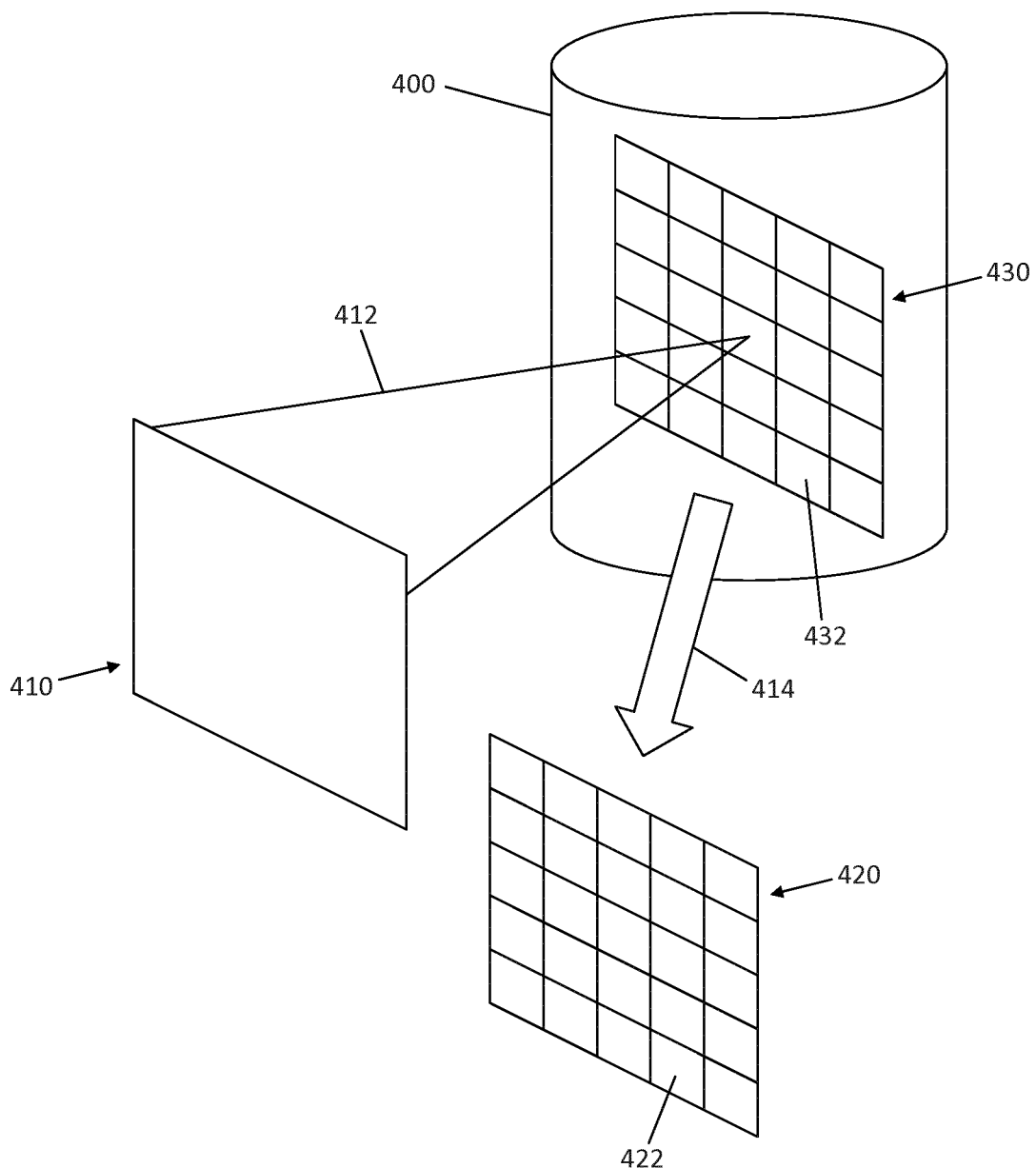
FIG. 4 is a schematic showing a holographic LIDAR system comprising an SLM producing a holographic reconstruction in a replay field within a scene and an array detector arranged to detect light from an array of individual fields of view (IFOVs) of the replay field within the scene, in accordance with embodiments.

FIG. 4 shows an embodiment of a holographic LIDAR system according to the present disclosure. Holographic LIDAR system comprises a spatial light modulator (SLM) 410 of a holographic projector arranged to direct light to a scene 400 and a light detector 420 arranged to collect reflected light 414 from the scene 400. As described above with reference to FIG. 1, SLM 410 is arranged to receive light from a light source (not shown) and output spatially modulated light 412 in accordance with a dynamically-variable computer-generated hologram represented or "displayed" on the SLM 410. SLM 410 receives a sequence of computer-generated holograms from a holographic controller (not shown) in order to form a corresponding temporal sequence of light footprints within the scene 400. SLM 410 forms each light footprint at a replay field 430 on the replay plane within the scene 400. The light footprint comprises "structured light", for example a light pattern of a plurality of discrete light features or sub-footprints that form light in a corresponding plurality of discrete sub-areas of the replay field 430.

Light detector 420 is an array detector comprising a plurality of individual light detectors 422 (also called "light detecting elements") arranged in an array. Each individual light detector 422 is arranged to receive light from a corresponding individual field of view (IFOV) 432 in the scene 400. Light detector 420 is configured to collect light 414 reflected from the replay field 430 where the light footprint is formed. Thus, the IFOV of each individual detector 422 is a sub-area 432 of the replay field 430, which has a position within the replay field 430 that corresponds or correlates to the position of the individual detector 422 within the detector array 420. Thus, it may be said that the replay field 430 comprises an array of individual fields of view 432 (IFOVs) within the scene 400, wherein each IFOV 432 does not overlap with other IFOVs 432. Accordingly, each light detector 422 is arranged to receive light reflected by object(s) within the corresponding IFOV 432. It may be said that there is a one-to-one correlation between an individual detector 422 and its corresponding IFOV 432 within the scene, although they may have different sizes. Thus, each detector 422 of the array detector 420 receives light from a unique sub-area (IFOV) of the scene 400, and does not receive light from any of the other sub-areas (IFOVs) of the scene 400.

In embodiments, the array detector 420 has an associated optical system (not shown in FIG. 4) arranged such that each individual light detector (or light detecting element) 422 receives light only from a corresponding IFOV 432 of the replay field 430 and does not receive light from other IFOVs 432, as described above. It may be said that the optical system divides the replay field 430 (in space) into a plurality of IFOVs 432 (non-overlapping sub-areas), as shown in FIG. 4, to provide a one-to-one mapping between unique sub-areas (IFOVs) of the replay field 430 and individual light detectors 422. The skilled person will understand that various types of optical system may be used to provide the one-to-one correlation between an individual detector 422 and its corresponding IFOV 432 within the scene 400. In embodiments, the optical system may comprise a single lens (as in a camera), or a micro-lens array where each micro-lens is associated with an individual detector 422.

In embodiments, array detector 420 may comprise a charge-coupled device (CCD) camera, wherein each detector 422 is an individual CCD of an array of CCD elements.

In other embodiments, array detector 420 may be a single-photon avalanche diode (SPAD) array comprising an array of SPAD elements. Any other suitable form of photodetector comprising an array of light sensing elements is possible and contemplated for this embodiment.

In embodiments, the light detector 420 comprising an array of light detecting elements 422 outputs a light response signal from each light detecting element 422. Thus, a time of flight value may be calculated for each sub-area or IFOV 432 of the replay field 430, based on the light response signal output by the corresponding light detecting element 422. Thus, a time of flight value to object(s) detected within one or more IFOVs 432 of the array of IFOVs 432 corresponding to the replay field 430 may be calculated at the same time.

There is therefore provided a light detection and ranging , "LIDAR", system arranged to scan (i.e. survey) a scene, the system comprising: a light source arranged to output light having a first characteristic or property; a spatial light modulator arranged to receive the light from the light source and output spatially-modulated light in accordance with computer-generated holograms displayed on the spatial light modulator; a holographic controller arranged to output a plurality of computer-generated holograms to the spatial light modulator, wherein each computer-generated hologram is arranged to form structured light having a corresponding pattern in a replay field within the scene, and the holographic controller is further arranged to change the pattern of structured light formed in the replay field by at least one of the plurality of computer-generated holograms; a light detector arranged to receive light having the first characteristic or property from the scene and output a light response signal, wherein the light detector comprises an array of light detecting elements, and an optical system associated with the array of light detecting elements, the optical system arranged such that each light detecting element receives light having the first characteristic from a respective (and unique) sub-area of the replay field within the scene.

In embodiments, the pattern of the structured light includes the form, shape and/or pattern of the light and light features across its area within the replay field. In the present disclosure, changes in the form, shape and/or pattern include, without limitation, changes in the size, shape, orientation, pattern, periodicity and brightness of the area of the structured light and/or individual features within the area of the replay field. The light may be infra-red (IR) light, visible light or ultra-violet light, dependent on application requirements. In embodiments, the LIDAR system uses IR light.

Figure 5A:
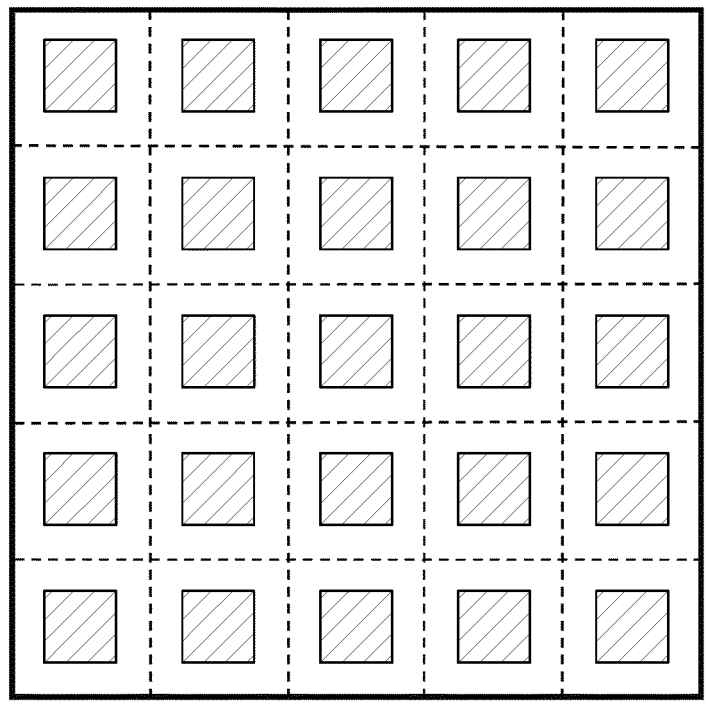
FIG. 5A shows first and second light footprints formed by respective first and second frames of a holographic scan, each footprint comprising structured light having a pattern of sub footprints or "light spots" for illuminating an array of IFOVs of a replay field within a scene, in which the shape of the light spots is changed between frames, according to one embodiment.
Figure 5A:
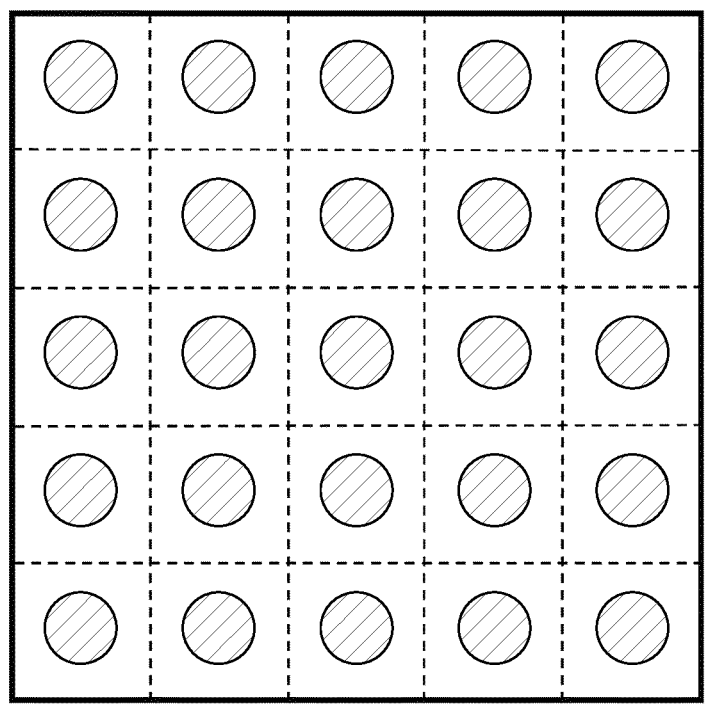

FIG. 5A shows first and second frames, corresponding to light footprints or images formed by an SLM displaying respective first and second holograms, of an embodiment. Each frame provides a light footprint or image in the form of structured light comprising a pattern of discrete light areas. In particular, the light footprint comprises a regular array of discrete areas or "light spots" of uniform brightness having a particular shape. It may be said that each of the light spots is a "sub footprint" of the light footprint and illuminates a sub area (i.e. IFOV) of the area (array of IFOVs) corresponding to the replay field within the scene. The light footprint is holographically projected by the SLM so that the light spots of the holographic reconstruction thereof illuminate corresponding IFOVs of the replay field within a scene. The light footprint is not moved between frames as in holographic "LIDAR scanning", but instead the shape of the light spots is changed between frames. It may be said that the light footprints in this example illuminate the same sub areas (IFOVs) of the same replay field (array of IFOVs) within the scene, but the light footprints of different frames use light of a different shape, form or structure. In this example, the shape of each light spot is changed in the second frame but it will be understood that this is merely one example of a change to the structured light that may be made in accordance with the present disclosure. For the avoidance of doubt, the present disclosure is not limited to changing only the shape of each light spot and extends to the full scope of the appended claims encompassing any change to the nature of the structured light from one frame to the next. FIG. 5A shows a sequence of first and second frames, in which the shape of the light spots of the light footprint is changed from square light spots in the first frame to circular light spots in the second frame. The first and second frames thus illuminate differently shaped areas or light spots within the same IFOVs within the scene. Whilst FIG. 5A shows two differently shaped light spots, the shape of the light spots may change plural times, such as three or more times, using other shapes, during a scan or survey comprising further frames (if any).

In the embodiment of FIG. 5A, the light footprint/image comprises a large number of uniformly illuminated discrete areas or "light spots", corresponding to the number of IFOVs in the array (i.e. the number of light detecting elements in array detector), and each light spot is relatively large. In consequence, the light output of the SLM is distributed over a relatively large area, and brightness of the light spots is relatively low owing to the holographic process, as described above. This may adversely affect the surveying quality, such as the resolution of the resulting "image", in particular although not exclusively when using a conventional photodetector array such as CCD camera.

Accordingly, in some embodiments, an array of more sensitive photodetectors may be used, such as a SPAD array (or the like). However, when using a SPAD array detector, the time between frames/holographic images may need to consider the "recovery time" of the SPAD elements. In some embodiments, the frame rate is changeable, optionally, based on a recovery time of the SPAD elements. In some embodiments, the optical power of at least one light spot is changeable, optionally based on a recovery time of at least one corresponding SPAD element. In some embodiments, the optical power of the light spots, or a selected subset of the light spots, is changed by reducing the intensity of the light incident upon the spatial light modulator or changing the hologram pattern. In a SPAD array, repeated photon detection by every SPAD element from successive or consecutive frames may lead to saturation. In consequence, an avalanche recovery technique must be performed to recover to the bias voltage required for photon detection. During the avalanche recovery process, the SPAD element is unable to detect photons. Thus, sufficient time between frames for avalanche recovery is allowed.

Figure 5B:
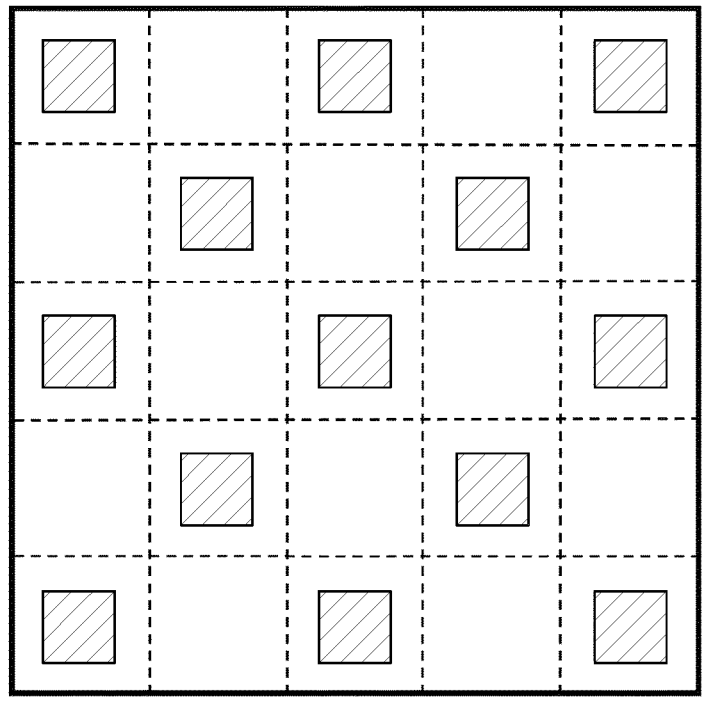
FIG. 5B shows first and second light footprints formed by respective first and second frames of a holographic scan, each footprint comprising structured light having a pattern of light spots for illuminating a subset of IFOVs of an array of IFOVs of a replay field within a scene, in which the pattern of light spots is changed between frames so as to illuminate a different subset of IFOVs, according to another embodiment.
Figure 5B:
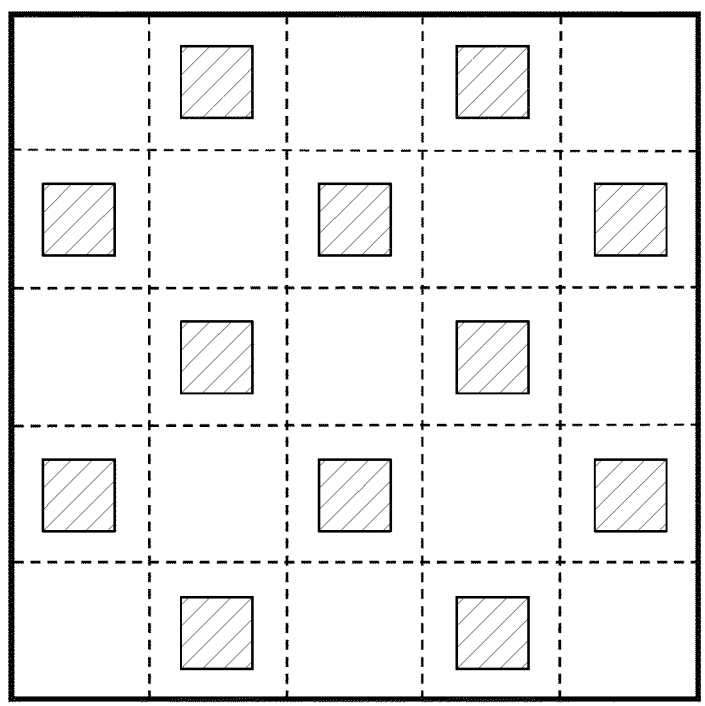

FIG. 5B shows first and second frames, corresponding to light footprints or images formed by an SLM displaying respective first and second holograms, of another embodiment. Each frame provides a light footprint or image in the form of a pattern of light areas or sub-footprints. In particular, the light footprint comprises a pattern of discrete square areas or "light spots" of uniform brightness, arranged at periodic intervals in an array corresponding to an array of IFOVs corresponding to the replay field within a scene. More specifically, in the illustrated light footprint, the light spots in each row in the array are positioned at every second IFOV (i.e., spaced by one IFOV) so that the periodic pattern comprises alternating light and dark areas. It may be said the light spots are arranged in a so called "checkerboard" pattern. The light footprint/image is holographically projected by the SLM so that the light spots concurrently illuminate corresponding IFOVs of the replay field within a scene. Each light spot or sub footprint illuminates a corresponding IFOV, so that the light footprint concurrently illuminates a subset comprising alternate ones of the IFOVs of the array of IFOVs in a "checkerboard" pattern. FIG. 5B shows a sequence of first and second frames, in which the light footprint is not moved between frames as in holographic "LIDAR scanning", but illuminates the same replay field whereby the checkerboard pattern of the light footprint of the first frame is reversed in the second frame. It may be said that the subset of IFOVs illuminated or probed by the light footprint is changed between the first and second frames.

The light footprint/image of the embodiment of FIG. 5B comprises a smaller number of discrete light spots or sub footprints compared with the embodiment of FIG. 5A. Accordingly, the brightness of the light spots is increased and the surveying quality, such as the resolution of the resulting "image", is therefore improved, in particular although not exclusively when using a light detector comprising a CCD array. Moreover, the embodiment of FIG. 5B comprises a light footprint comprising a periodic pattern of alternate light and dark areas or spots, individual elements of the array detector only receive reflected light every other frame (or every second frame). Thus, additional recovery time from saturation is provided for a SPAD array detector.

Figure 5C:
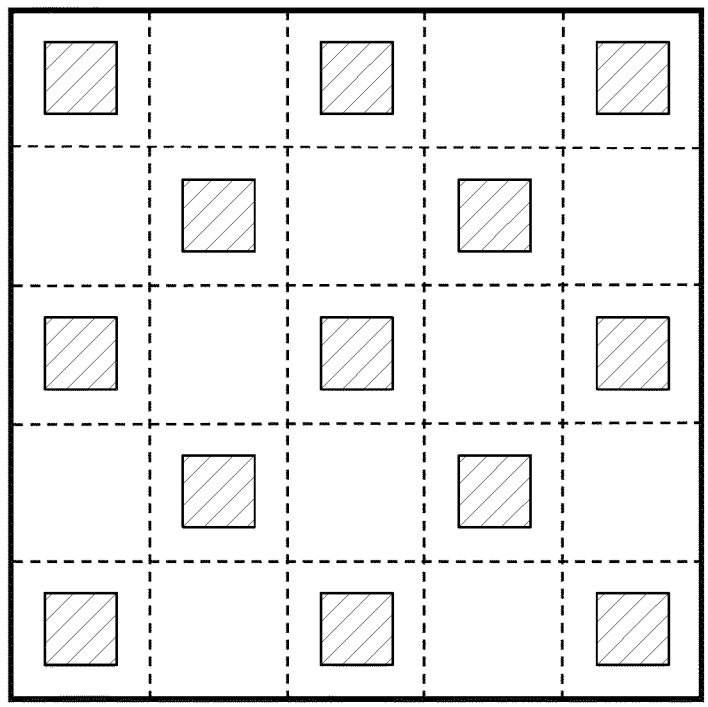
FIG. 5C shows first and second light footprints equivalent to the embodiment of FIG. 5B, in which the shape of the light spots is additionally changed between frames, according to yet another embodiment.
Figure 5C:
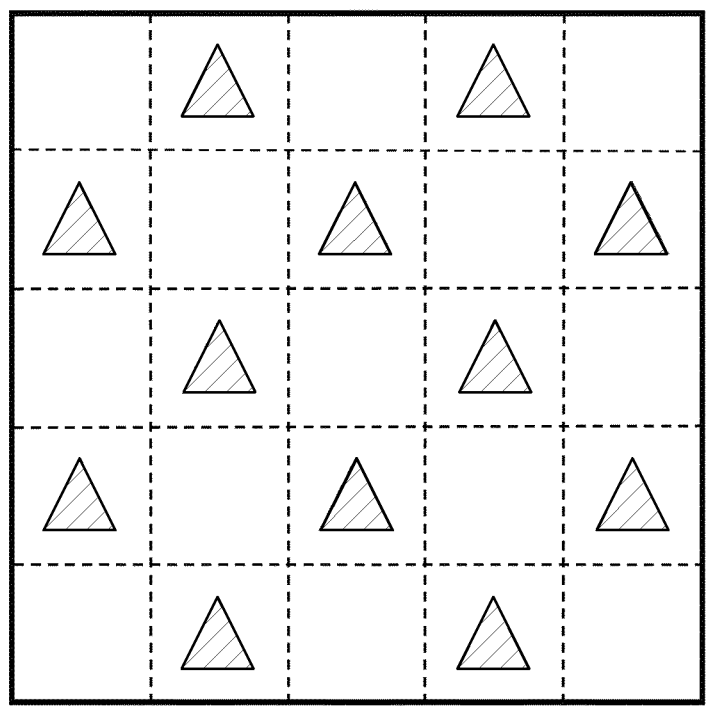

Whilst the light footprint/image of FIG. 5B is in a checkerboard pattern of alternating light and dark spots (i.e. with light spots arranged at every second IFOV), other period patterns are possible. For example, the light spots in the array of IFOVs may be arranged at every third (i.e. nth) IFOV in a row and/or column, with a corresponding increase in the spacing (i.e. n−1) between light spots. Increasing the spacing between light spots, and thus reducing the periodicity of the light spots, requires a corresponding increase in the number of frames to illuminate the array of IFOVs within the scene. This, in turn, allows more recovery time for the light detecting elements (e.g. SPAD elements), for example when used in conjunction with changing the shape of the light spots as illustrated in FIG. 5C described below. Since the increased periodicity leads to a reduction in the total number of light spots in the frame, and therefore increased brightness of the light spots, the quality of the scan may be further improved.

FIG. 5C shows first and second frames, corresponding to light footprints or images formed by an SLM displaying respective first and second holograms, of another embodiment, which combines the techniques of the embodiments of FIGS. 5A and 5B. In particular, each frame provides a light footprint/image in the form of a checkerboard pattern of discrete areas or "light spots" of uniform brightness of a particular shape (i.e. sub footprints). The light footprint/image is holographically projected by the SLM so that the light spots/sub footprints concurrently illuminate corresponding IFOVs of an array of IFOVs corresponding to the replay field within a scene. The light footprint is not moved between frames as in holographic "LIDAR scanning", but both the checkerboard pattern and the shape of the light spots is changed between frames. FIG. 5C shows a sequence of first and second frames, in which the shape of the light spots is changed from square to triangular, and the checkerboard pattern is reversed, from the first frame in the second frame. The first and second frames thus illuminate differently shaped areas within alternate IFOVs of the same replay field within the scene. Third and fourth frames may repeat the checkerboard pattern of the light footprint of the first and second frames, but reverse the shape of the light spots, so that all the IFOVs in the array are illuminated by the same light spots by the sequence of first to fourth frames. Again, for the avoidance of doubt, each light spot may have any shape including circular, elliptical or polygonal including any number of sides.

In the embodiments of FIGS. 5A to 5C, the light footprint comprises a plurality of discrete areas or "light spots". The light spots may therefore be considered as individual "sub footprints" within a holographic image formed by a hologram. The sub footprints illuminate or "probe" corresponding IFOVs within the scene concurrently. This may be useful for a fast scan or survey to obtain initial information (e.g. to provide a relatively coarse/low quality scan) that can be used as feedback for intelligent scanning (e.g. to enable relatively fine/high quality scan or survey of areas of potential interest), as described below with reference to FIG. 11.

In further embodiments, the sequence of light footprints may be arranged so that one or more of the IFOVs of an array of IFOVs corresponding to the replay field within a scene are scanned individually. In some embodiments, one or more IFOVs are scanned simultaneously or concurrently. Embodiments that individually scan an IFOV are described below with reference to FIGS. 6 and 7.

Figure 6:
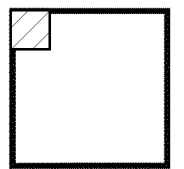
FIG. 6 shows a sequence of light footprints formed by a sequence of frames of a holographic scan, each footprint comprising structured light for individually scanning an IFOV of an array of IFOVs of a replay field within a scene using a single sub-footprint or "light spot", according to a still another embodiment.
Figure 6:
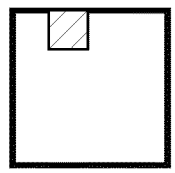
Figure 6:
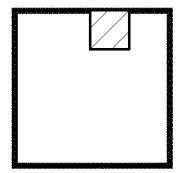
Figure 6:
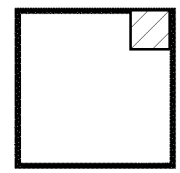
Figure 6:
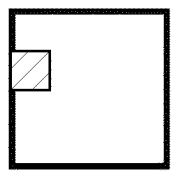
Figure 6:
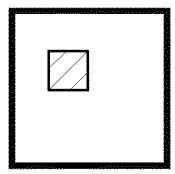
Figure 6:
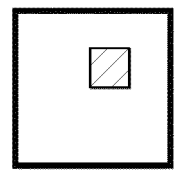
Figure 6:
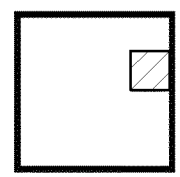
Figure 6:
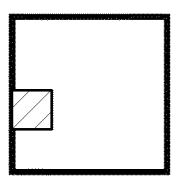
Figure 6:
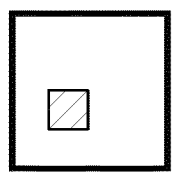
Figure 6:
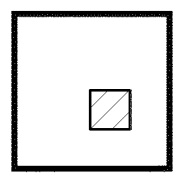
Figure 6:
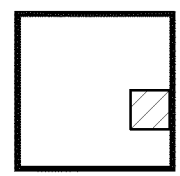
Figure 6:
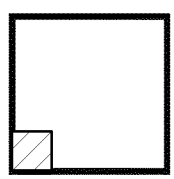
Figure 6:
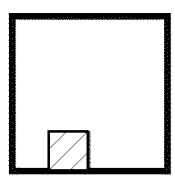
Figure 6:
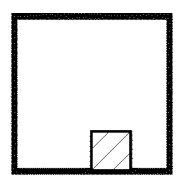
Figure 6:
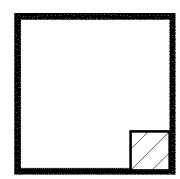

FIG. 6 shows a frame sequence for scanning an IFOV within a scene of one embodiment. In particular, FIG. 6 shows a sequence of sixteen (16) frames for scanning a single IFOV within an array of IFOVs corresponding to the replay field within a scene. The illustrated frames correspond to at least part of the images, formed by an SLM displaying 16 holograms, falling within an area corresponding to the single IFOV. Other areas of the holographic images, falling within areas corresponding to other IFOVs, may be different, as described further below. Each frame provides a "sub footprint" of light, since it illuminates just a single IFOV. In the embodiment of FIG. 6, the sub footprint is a single square area or discrete "light spot" of uniform brightness, which is repositioned within the IFOV between frames. The sub footprint is holographically projected so that it illuminates only a fraction of the total area of the corresponding IFOV (sub-area of the replay field) within the scene. In FIG. 6, each light spot illuminates one sixteenth (1/16) of the total area of the IFOV. In the first frame (Frame 1), the light spot is located in the top left corner of the IFOV, to illuminate a corresponding area of the IFOV within the scene. In each consecutive frame of the scan, the light spot is moved from left to right and top to bottom within the IFOV, as shown in Frames 2 to 15. Finally, in the last frame (Frame 16), the light spot is located in the bottom right corner of the IFOV. Whilst the example of FIG. 16 moves the light spot to sixteen positions of a 4×4 array within the IFOVs, other array sizes, with corresponding numbers of frames, are possible. Furthermore, the light spots can be moved to the sixteen positions in any other order, such as in raster scan order.

In some implementations of the embodiment of FIG. 6, a single IFOV of the array of IFOVs within the scene may be individually scanned using the sequence of frames. The single IFOV may be selected based on feedback, randomly or otherwise. The remaining IFOVs may be illuminated with light spots of any desired shape, size or orientation, or provided with no illumination, in one or more of Frames 1 to 16, according to application requirements. In other implementations, each IFOV of a selected subset of an array of IFOVs corresponding to the replay field within the scene (which may include all the IFOVs in the array) may be individually and independently scanned at the same time, using the frame sequence of FIG. 6.

In the embodiment of FIG. 6, a single light spot/sub footprint illuminates only one sixteenth of the area of an IFOV, so that the brightness of the light spot may be increased, and thus the surveying quality is improved. However, a relatively large number of 16 frames/holograms is required to perform the scan of each IFOV within a scene, which consumes time and resources associated with the SLM.

Figure 7:
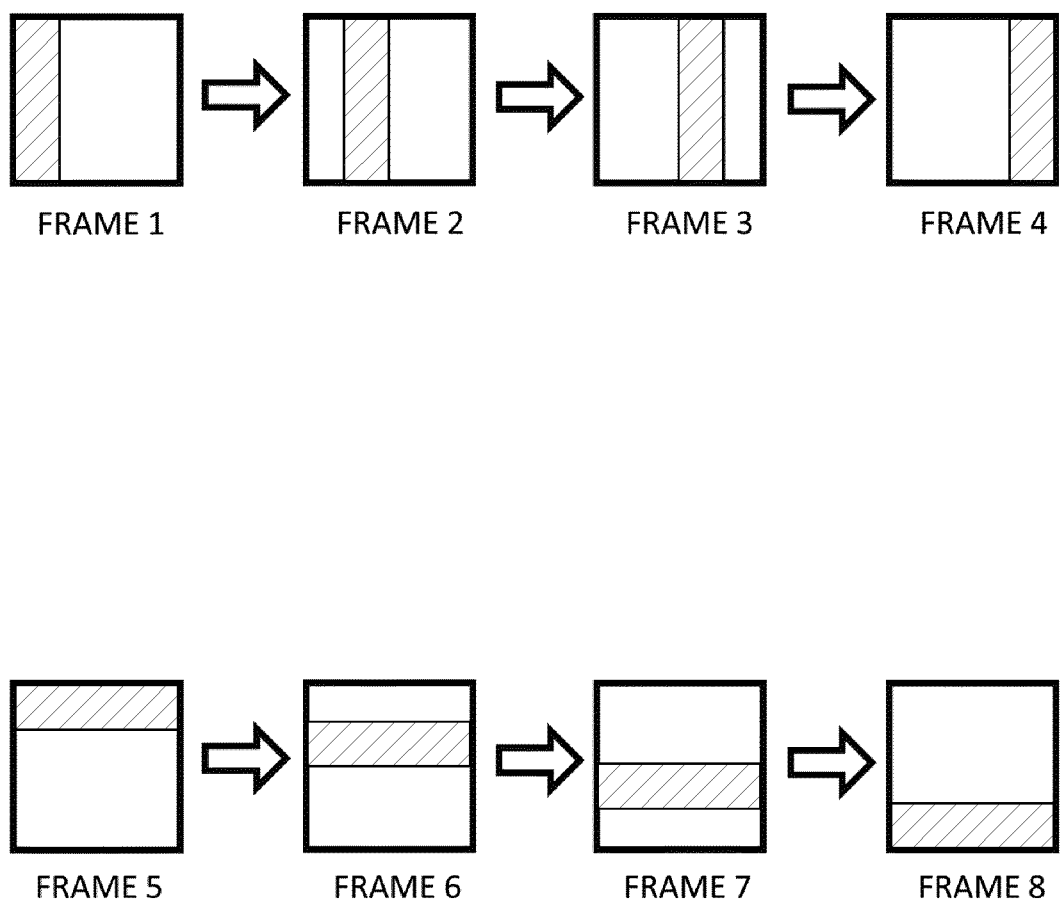
FIG. 7 shows a sequence of light footprints formed by a sequence of frames of a holographic scan, each footprint comprising structured light for individually scanning an IFOV of a replay field within a scene using a one-dimensional sub-footprint or "line", according to a further embodiment.

FIG. 7 shows a frame sequence for scanning an IFOV within a scene of another embodiment, in which the number of frames/holograms is reduced compared with the embodiment of FIG. 6. In particular, FIG. 7 shows a sequence of eight (8) frames, for scanning a single IFOV within an array of IFOVs corresponding to the replay field within a scene. The illustrated frames correspond to at least part of the images, formed by an SLM displaying 8 holograms, falling within an area corresponding to the single IFOV. Each frame provides a "sub footprint" of light, since it illuminates just a single IFOV. In the embodiment of FIG. 7, the sub footprint is a one-dimensional area or "line" of uniform brightness, which is repositioned with the single IFOV between frames. Thus, the "line" may be regarded as a one-dimensional sub footprint, which corresponds to the "light spot" of other embodiments. The sub footprint is holographically projected so that it illuminates only a fraction of the total area of the corresponding IFOV within the scene. In particular, the line/sub footprint illuminates a vertical or horizontal area of the IFOV within the scene. In the illustrated example, the line illuminates a quarter (¼) of the total area of the IFOV. In particular, in Frames 1 to 4, the line illuminates a vertical area on the left-hand side of the IFOV, which is moved horizontally, in a direction from left to right, between frames as shown in FIG. 7. Similarly, in Frames 5 to 8, the line illuminates a horizontal area at the top of the IFOV, which is moved vertically in a direction from top to bottom, between frames as shown in FIG. 7. Whilst the example of FIG. 7 performs a line scan in two directions (horizontal and vertical), this is not essential. A single line scan of an IFOV within a scene may move the line in only one direction, for example as in Frames 1 to 4 (horizontal scan) or as in Frames 5 to 8 (vertical scan).

The shape of the sub footprint in the embodiment of FIG. 7 thus comprises a line that illuminates a fraction (e.g. ¼) of a single IFOV. The line need not be oriented horizontally/vertically, but could extend diagonally for example. The brightness of the line, compared with the single light spot of the embodiment of FIG. 6, is reduced (but is nevertheless brighter than other embodiments). However, a reduced number of frames/holograms is required to perform the scan of an IFOV of an array of IFOVs within a scene, which reduces the time and resources of the SLM required.

In some implementations of the embodiment of FIG. 7, a selected single IFOV of the array of IFOVs corresponding to the replay field within the scene may be individually scanned using the sequence of frames. The single IFOV may be selected based on feedback, randomly or otherwise. The remaining IFOVs may be illuminated with light spots of any desired shape, size or orientation, or provided with no illumination, in one or more of Frames 1 to 8, according to application requirements. In other implementations, each IFOV of a selected subset of an array of IFOVs corresponding to the replay field within the scene (which may include all the IFOVs) may be independently scanned at the same time, using the frame sequence of FIG. 7. In some embodiments, a plurality of IFOVs are scanned at the same time, optionally, scanned in different directions or orientations. An embodiment is described below with reference to FIG. 8.

Figure 8:
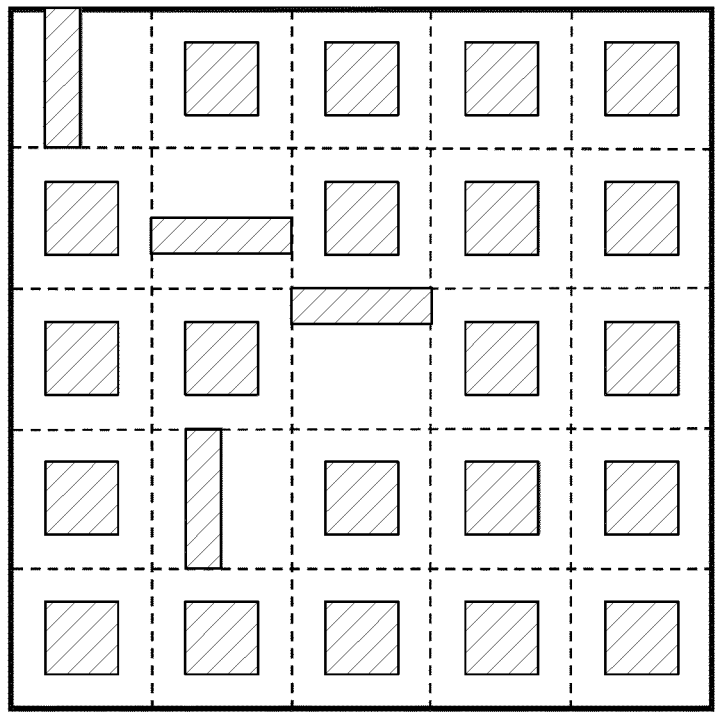
FIG. 8 shows nth and (n+1)th light footprints formed by corresponding frames of a holographic scan, each footprint comprising structured light for illuminating an array of IFOVs of a replay field within a scene using a different sub-footprint for each IFOV, according to yet another embodiment.
Figure 8:
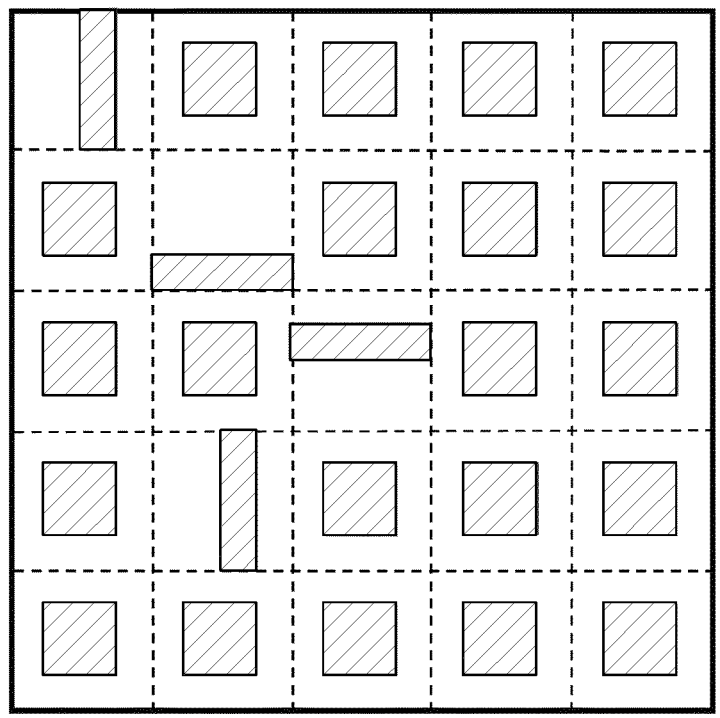

FIG. 8 shows two consecutive frames of a frame sequence of another embodiment. In particular, each illustrated frame provides a light footprint/image in the form of a plurality of sub footprints, each for illuminating a corresponding IFOV. The light footprint/image is holographically projected so that the sub footprints of light concurrently illuminate corresponding IFOVs of an array of IFOVs corresponding to the replay field within a scene. In this embodiment, individual IFOVs are scanned using a "line" or one-dimensional sub footprint in accordance with the embodiment of FIG. 7, in a selected plurality of IFOVs. In particular, a line scan is performed, using Frames 1 to 8 of FIG. 7, in the top left IFOV of an array of IFOVs. In FIG. 8, Frame N shows the light footprint includes a line/sub footprint illuminating a vertical area in one frame position within the top left IFOV, and frame N+1 shows the line/sub footprint illuminating a vertical area in an adjacent frame position within the top left IFOV. Thus, a fine scan of the top left IFOV (i.e. at position (1, 1) in the 5×5 array of IFOVs within the scene) is performed using the frame sequence. Other selected IFOVs within the array (i.e. at positions (2, 2), (3, 3) and (2, 4)) are also scanned by lines. The remaining IFOVs are illuminated with light spots that are shaped and sized as required (e.g. square light spots are illustrated). As described above, the remaining IFOVs may be illuminated only during selected frames of Frames 1 to 8.

The selection of IFOVs for individual scanning may be performed based on feedback, for example from a previous scan. The use of feedback to determine or select a light footprint and/or a sequence of light footprints and/or area for scanning is described further below in relation to FIG. 11.

Scanning within an IFOV, for example using light spots as in FIG. 6 or lines as in FIGS. 7 and 8, works synergistically with a sensitive or low-resolution detector, such as a SPAD array as discussed above. In particular, in conventional LIDAR and similar applications, the spatial resolution of a SPAD array is typically considered to be too low. The use of holographic scanning of each IFOV, in accordance with the above embodiments of FIGS. 6 to 8, can compensate for this. It may be said that the temporal resolution and/or capability of the holographic projector is used to provide higher spatial resolution—to an extent that it is possible for a SPAD array to be used.

Figure 9:
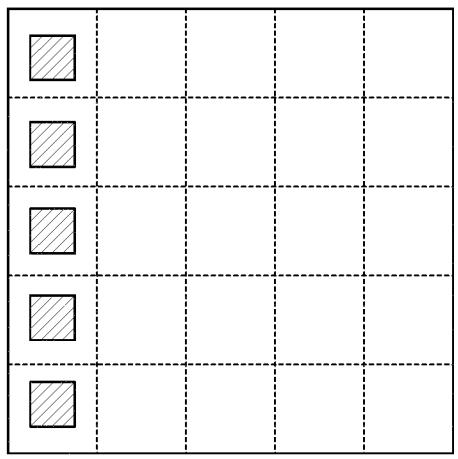
FIG. 9 shows first to fifth light footprints formed by first to fifth frames of a holographic scan, each footprint comprising structured light having a plurality of light spots in a line for illuminating a corresponding plurality of IFOVs in a column within an array of IFOVs of a replay field within a scene, in which the line of light spots is repositioned between frames, according to another embodiment.
Figure 9:
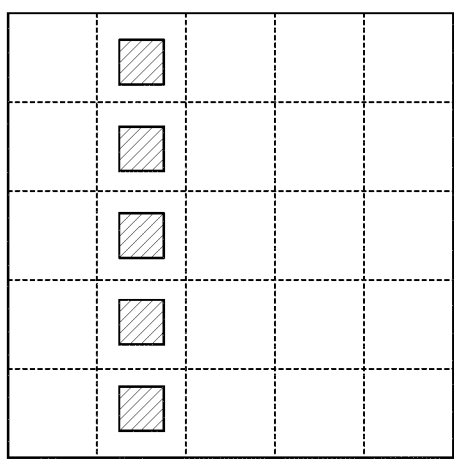
Figure 9:
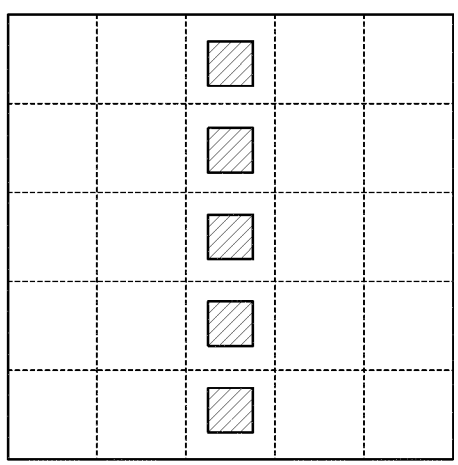
Figure 9:
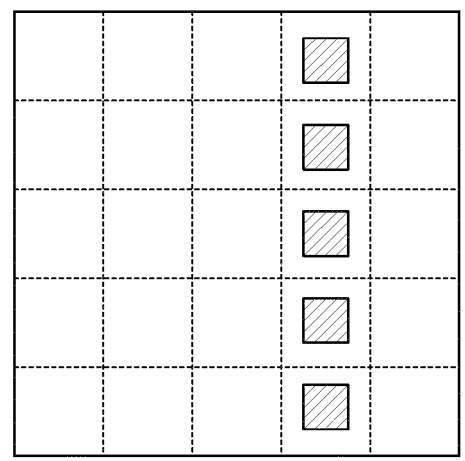
Figure 9:
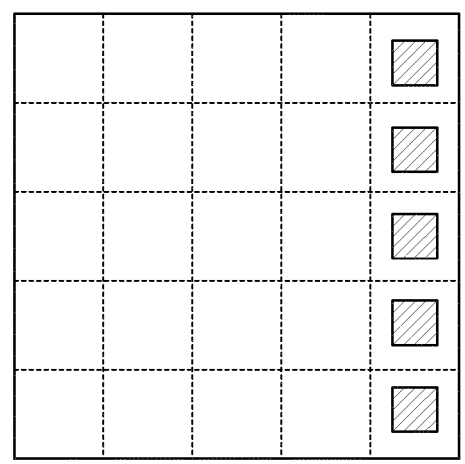

FIG. 9 shows a sequence of five (5) frames, corresponding to light footprints or images formed by an SLM displaying respective first to fifth computer-generated holograms, of another embodiment. Each frame provides a light footprint or image comprising a column of square discrete areas or "light spots" having uniform brightness, which together resemble a (vertical) line. The line of light spots or sub footprints may be regarded as a "pseudo line". The light footprint/image is holographically projected so that the light spots illuminate corresponding IFOVs in a column of an array of IFOVs corresponding to the replay field within a scene. Thus, a column of IFOVs within the scene are concurrently illuminated by the light footprint. FIG. 9 shows a sequence of five frames, in which the light footprint/column of sub footprints is repositioned within the scene between successive frames to illuminate adjacent IFOV columns. It may be said that the pseudo line is moved horizontally across the array of IFOVs of the replay field within the scene. Thus, Frame 1 illuminates the first (left hand) column of IFOVs, Frame 2 illuminates the second column of the IFOVs and so on until Frame 5 illuminates the fifth (right hand) column of IFOVs.

In some embodiments, the light footprint is used to probe a real-world scene including a road for vehicles. In these embodiments in particular, it will be understood that light spots at the top of the light footprint may correspond with objects, such as vehicles, which are further away than objects corresponding to light spots at the bottom of the light footprint. Likewise, light spots to the left of the pattern may correspond to objects in lane 1 of a motorway, light spots in the middle may correspond to lane 2 and light spots to the right may correspond to lane 3. It may be said that plural ranges are probed by the dynamically changing light footprint. FIG. 9 shows horizontal scanning of a vertical line (pseudo line). In other embodiments, a horizontal line is scanned vertically. In some embodiments, vertical scanning with a horizontal line advantageously starts at the bottom of the scene (closest range) and move towards the top of the scene (furthest range). This concept of starting a scan with the area corresponding to the smallest range and increasing range with each successive frame may be extended to the scanning of IFOVs described above. More generally, in some embodiments, scanning of the scene or an IFOV begins with the area of the scene or IFOV identified as containing or representing the most immediate risk of collision.

The embodiments of FIGS. 4, 5A-C, 8 and 9 show a 5×5 array of IFOVs corresponding to the replay field, for the purpose of illustration only. The light detector array (e.g. SPAD array) may comprise any number of light detecting elements (e.g. SPAD elements), having corresponding IFOVs of the replay field, and in any desired configuration (e.g. a rectangular array). Thus, the sequence of frames illustrated in the embodiments may vary according to the number and arrangement of the light detectors of the light detector array.

Figure 10:
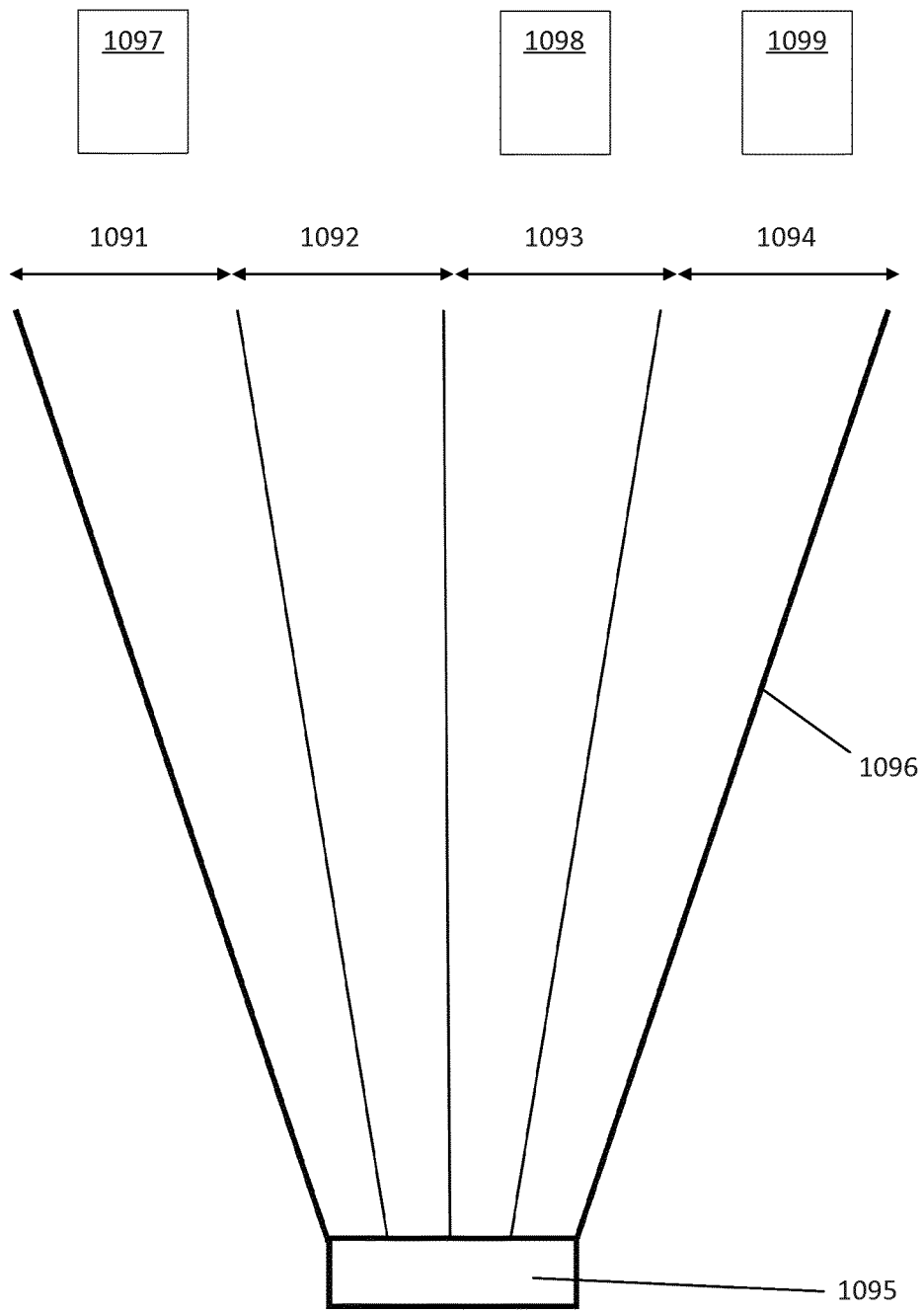
FIG. 10 illustrates how the holographic projector may be used to effectively increase the spatial resolution of a detector having a field of view.

FIG. 10 shows one example SPAD element 1095 of a SPAD array. The SPAD element 1095 has a field of view (i.e. an individual field of view (IFOV)) defined by a solid angle cone 1096. The solid angle cone 1096 is a measure of spatial resolution. The SPAD element 1095 only detects light within the field of view. If the field of view is large, the spatial resolution is small. That is, the source of any detected light within the field of view may only be identified with low precision—e.g. to the nearest 100 cms. If the field of view is small, the spatial resolution is high. That is, the source of any detected light within the field of view may be identified with higher precision—e.g. to the nearest 1 cm. A SPAD array is generally considered to be a low (spatial) resolution array detector. An array detector is a group of individual detectors which provide data from each detector in parallel. That is, an array detector provides parallelism of data from the detector elements. There is described herein a LIDAR system in which the high frame rate of the holographic projector (e.g. video frame rates or higher) is used to effectively increase the spatial resolution of an array detector having a field of view such as a SPAD array. This is achieved by individually scanning a field of view of a SPAD element 1095, for example as described above in relation of FIGS. 6 and 7. In a first display frame, a light spot or sub footprint is directed to a first area 1091 of the field of view (IFOV). That is, a first light spot is holographically reconstructed in first area 1091. A first object 1097 is present in the first area 1091. The first object 1097 reflects light towards the SPAD element 1095 of the array of SPAD elements. This light is detected by the SPAD element 1095 and a time of flight measurement may be used to indicate the distance to the first object 1097. The holographic projector and array detector are synchronised such that the system identifies that the first object 1097 is in first area 1091 because that is the only sub-area of the field of view (IFOV) that was illuminated. In a second display frame displayed later (in time) than the first display frame, a second light spot or sub footprint is directed to a second area 1092 of the field of view (IFOV). An object is not present in the second area 1092 so no light is reflected back to the SPAD element 1095 and the system identifies that an object is not present in second area 1092. Likewise, in a third display frame after the second display frame, light is holographically directed to a third area 1093 containing a second object 1098 and in a fourth display frame after the third display frame, light is holographically directed to a fourth area 1094 containing a third object 1099. It will be understood that in this system, the SPAD element will be able to identify the location of an object within the field of view (IFOV) with a factor of four greater accuracy. The high temporal rate of the display system is used to increase the spatial resolution of the detection. It will be understood that four areas of the field of view (IFOV) are described by way of example only and the field of view may be divided into any number of areas to increase the effective spatial resolution of the array detector such as SPAD array. It will be understood that the described method may be applied to each SPAD element of a SPAD array in order to increase the spatial resolution of the entire array detector across the collective field of view.

There is therefore described a LIDAR system in which a first computer-generated hologram forms a first structured light pattern and a second computer-generated hologram forms a second structured light pattern, wherein the first structured light pattern includes a first light spot in a first area of the individual field of view of a detector element of an array of detector elements and the second structured light pattern includes a second light spot in a second area of the individual field of view in order to increase the spatial resolution of the detector element. This is achievable because the holographic image can be refreshed (i.e. changed) at video rates or higher and the smallest feature which can be displayed by the holographic projector is smaller than the individual field of view of a detector element.

Embodiments provide a feedback system in which the results of a first scan or survey are used to determine the computer-generated holograms for a second scan or survey. The step of determining the computer-generated holograms for the second survey may comprise selecting the holograms from a repository of holograms or calculating the holograms.

Figure 11:
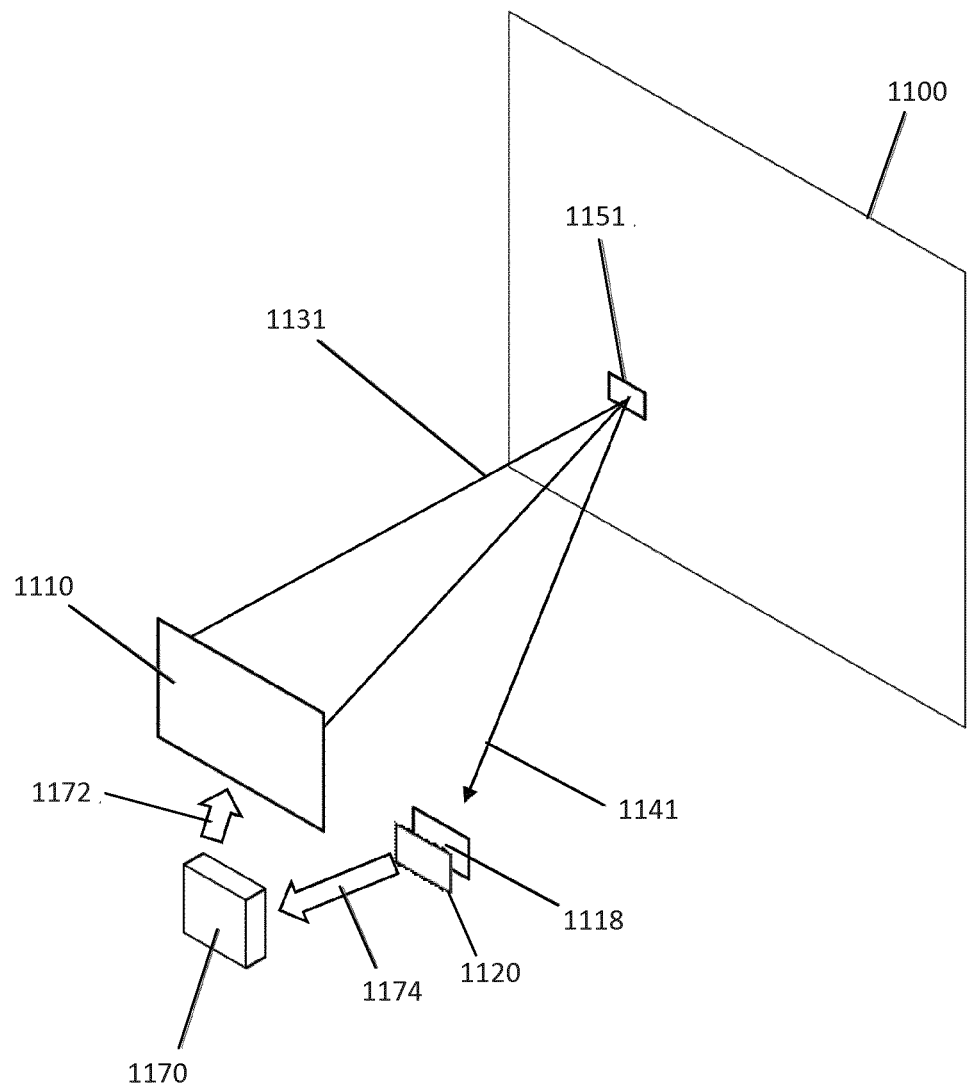
FIG. 11 shows a feedback system for determining a plurality of computer-generated holograms based on a received signal from the light detector.

FIG. 11 shows an embodiment comprising a spatial light modulator 1110 of a holographic projector arranged to direct light to a scene 1100 and a light detector 1120 arranged to collect reflected light from the scene. Spatial light modulator 1110 is arranged to receive light from a light source (not shown) and output spatially modulated light in accordance with a dynamically-variable computer-generated hologram represented or "displayed" on the spatial light modulator 1110. FIG. 11 shows the spatial light modulator 1110 outputting first spatially modulated light 1131 forming a first light footprint 1151 in a replay field within the scene 1100 in accordance with a first computer-generated hologram (not shown) represented on the spatial light modulator 1110. As described herein, the light detector 1120 may comprise an array detector, where each detecting element in the array has an individual field of view (IFOV) of an array of IFOVs corresponding to the replay field within the scene 1100. The first light footprint may be part of a first survey, which comprises a plurality of light spots or sub footprints to illuminate a plurality of IFOVs within the scene as in FIGS. 5A-C, for example.

FIG. 11 shows light detector 1120 receiving reflected light 1141 from the region of the scene 1100 illuminated by the first light footprint 1151. For example, the light may be reflected off an object in the scene. In embodiments, the light detector 1120 comprises a plurality of light detecting elements. FIG. 11 further shows an optical system 1118 associated with the light detecting elements. The optical system 1118 is arranged to provide a one to one correlation between the light detecting elements of the light detector 1120 of embodiments and sub-areas of the replay field. In some embodiments, the optical system 1118 is a lens or array of lenses such as microlenses. The skilled artesian knows how to provide such as optical system with the functionality described. For example, the optical system may be analogous to the lens used with a CCD camera to provide a one to one correlation between the individual CCD pixels and sub-areas of a scene. In response to receiving the reflected light 1141, light detector 1120 outputs a light response signal 1174. A holographic controller 1170 is arranged to receive the light response signal 1174 and determine a second plurality of computer-generated holograms for a second survey. For example, as described below, the second plurality of computer-generated holograms may output a sequence of light footprints for individually scanning the IFOV containing the object in the scene as in FIG. 6 or 7, for example.

The holographic controller 1170 may assess a property of the light response signal 1174 in order to determine the second plurality of computer-generated holograms. In embodiments, the holographic controller 1170 determines if the light response signal 1174 indicates that an object is present in an area (e.g. IFOV) of the replay field (e.g. array of IFOVs) illuminated or "probed" by the first light footprint. In some embodiments, the property of the light response signal 1174 is the maximum (or peak) intensity or average (or mean) intensity of the light response signal 1174. In other embodiments, the property of the light response signal 1174 is change in the intensity of the light response signal 1174 or a rate of change of intensity in the light response signal 1174. The property of the light response signal may be any property of the light response signal 1174, or any feature in the light response signal 1174, which may provide information about the area(s) probed or any objects in the area(s) probed by the first light footprint 1151. For example, the holographic controller 1170 may determine if the magnitude of the light response signal 1174 exceeds a threshold value. For example, in embodiments, the holographic controller 1170 determines that an object is present in a sub area (e.g. IFOV) of the replay field (e.g. array of IFOVs) probed by the first light footprint 1151 and determines a second plurality of computer-generated holograms arranged to scan the sub area (e.g. IFOV) in which the object is present again at high resolution. For example, in other embodiments, the holographic controller 1170 determines that the light response signal 1174 is inconclusive (for example, relatively noisy) and determines a second plurality of computer-generated holograms arranged to survey the same area (replay field) of the scene again but in a different direction.

Accordingly, in embodiments, a sequence of frames/sub footprints may individually scan or survey a selected IFOV of an array of IFOVs corresponding to the replay field within a scene, for example as described above with reference to FIGS. 6 and 7. The selection of one or more IFOVs for individual scanning using the sequence of frames/sub footprints may be performed based on feedback, for example from a first scan or survey of the array of IFOVs (replay field) within the scene using a relatively coarse/low quality scan or survey. Thus, a first plurality of computer generated holograms may be arranged to provide a first survey of the area (replay field) comprising the array of IFOVs. The holographic controller may be arranged to receive the light response signal in response to the first survey, and assess a property of the light response signal in order to identify one or more IFOVs of the array of IFOVs of interest (e.g. for a relatively fine/high quality scan or survey), such as IFOVs in which an object is potentially present. The holographic controller may then determine or select a second plurality of computer generated holograms to provide a sequence of light footprints, including sub footprints for individually scanning the identified IFOV(s), as a second survey of the same area (replay field) comprising the array of IFOVs.

Variations of Embodiments

In embodiments, the spatially light modulator is a phase-only spatial light modulator. These embodiments are advantageous because no optical energy is lost by modulating amplitude.

Accordingly, an efficient holographic LIDAR system is provided. However, the present disclosure may be equally implemented on an amplitude-only spatial light modulator or an amplitude and phase modulator. It may be understood that the hologram will be correspondingly phase-only, amplitude-only or fully-complex.

Figure 12:
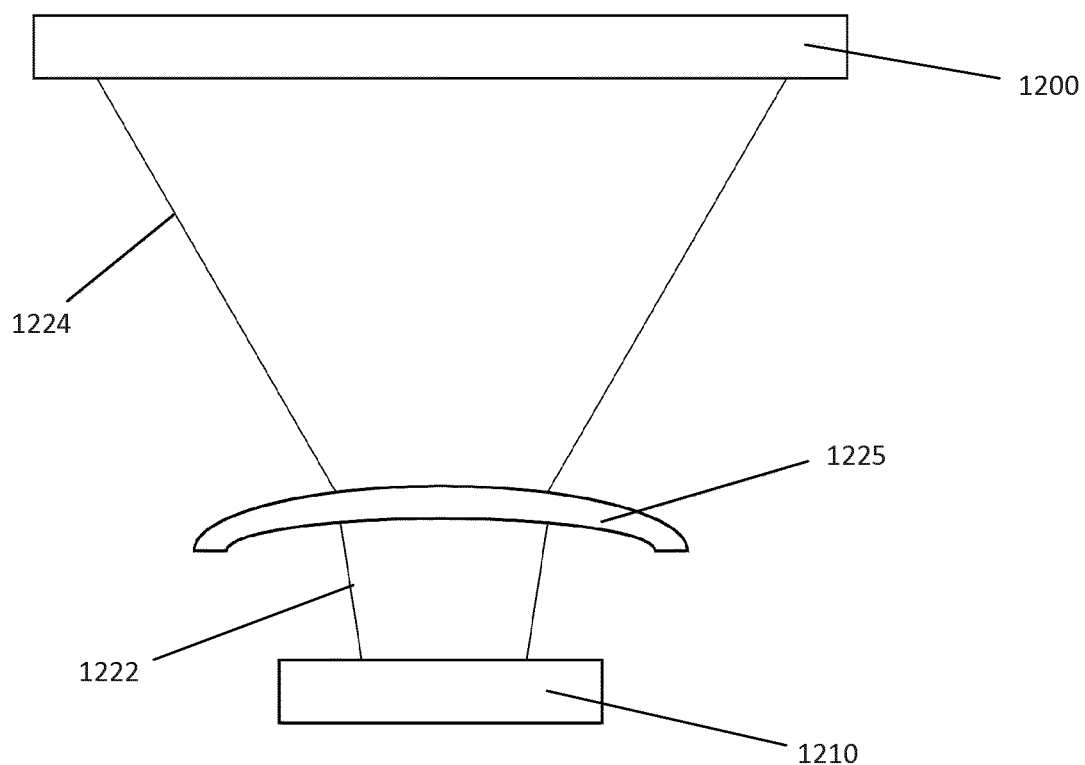
FIG. 12 shows an example of an angular magnification system.

Embodiments include an angular magnification system to increase the field of view (i.e. to increase the size of the replay field) of the system. FIG. 12 shows an angular magnification system 1225 arranged to receive spatially modulated light from a spatial light modulator 1210 at a first angle. The angular magnification system 1225 outputs spatially modulated light, at a second angle greater than the first angle, which illuminates a replay field within the scene 1200. FIG. 12 shows that the angular magnification system 1225 is arranged to receive light 1222 at a first angle and output light 1224 at a second angle greater than the first angle. It may be said that the angular magnification system magnifies the angle of light of the spatially modulated light. That is, in embodiments, the LIDAR system further comprises an angular magnification system arranged to magnify the angular deflection of the spatially-modulated light from the spatial light modulator. In embodiments, the angular magnification is provided by refraction. That is, in embodiments, the angular magnification system is arranged to refract the spatially-modulated light. In embodiments, the angular magnification system is arranged to receive the spatially modulated light at a first angle and output the spatially modulated light at a second angle, wherein the second angle is greater than the first angle. In some embodiments, the angular magnification system 1225 is the optical system arranged such that each light detecting element (of the light detector) only receives light from a corresponding/unique sub-area of the replay field. The size of each sub-area of the replay field may be greater than the size of the corresponding light detecting element.

In embodiments, the light is pulsed. Accordingly, in embodiments, the system is configured so as any reflected signal is received by the detector before the next light footprint irradiates the scene. Accordingly, the system can process any return signal before the next light footprint and no confusion between which footprint gave rise to a return signal can occur. The skilled person will understand how to synchronise the light source, holographic controller, spatial light modulator, light detector and any necessary processor in order to provide this functionality and so a detailed description is not provided here.

Each light footprint is formed using a corresponding computer-generated hologram. Each computer-generated hologram is displayed on the spatial light modulator in accordance with holographic data provided to the spatial light modulator. Each computer-generated hologram may be comprised of different data components. The data provides instructions for the spatial light modulator which individually address each light modulating pixel of the spatial light modulator. Specifically, the data may provide instruction for each pixel on how much to modulate light. In embodiments, the computer-generated hologram comprises first holographic data defining the size and shape of the light footprint and second holographic data defining the position of the light footprint in the scene. The first holographic data may include holographic data which provides an optical effect. In embodiments, the first holographic data comprises a lensing function. As described above, the second holographic data provides variable "beam steering" information. In embodiments, the second holographic data comprises a grating function.

Figure 13:
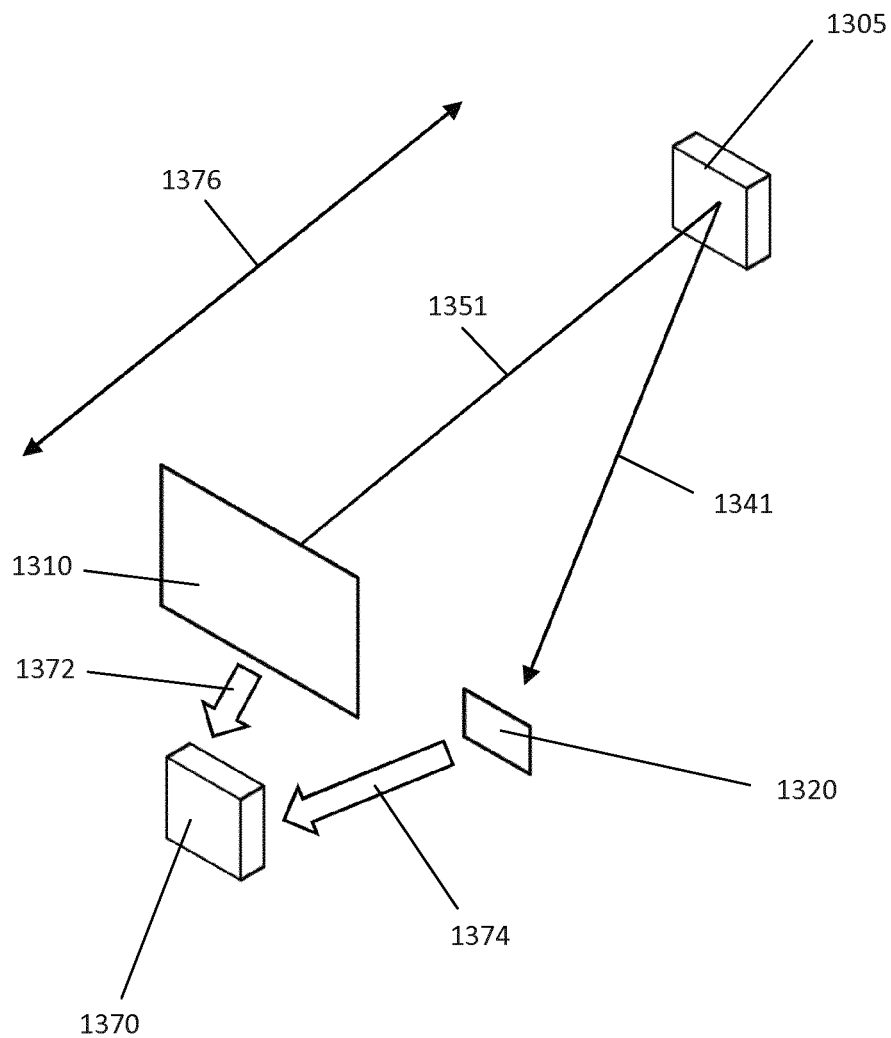
FIG. 13 illustrates a method for detecting and ranging of an object in accordance with embodiments.

FIG. 13 shows an embodiment comprising a processor 1370 in communication with the spatial light modulator 1310 and light detector 1320. In operation, processor 1370 is arranged to receive a light response signal 1374 from the light detector 1320 and synchronisation information 1372 from the spatial light modulator 1310. Spatial light modulator 1310 is arranged to output spatially modulated light 1351 forming a light footprint (not shown) at a position in the scene. An object 1305 at the position in the scene reflects spatially modulated light 1351 and the reflected light 1341 is detected by light detector 1320. For example, light detector 1320 may comprise a single light detecting element (e.g. single photodiode) or, in embodiments, an array of light detecting elements (e.g. one-dimensional or two-dimensional array of photodiodes), depending upon the light footprint and/or design requirements. Light detector 1320 or, in the case of an array detector, each light detecting element is configured to have a field of view within the scene. Light pulsing and synchronisation between the components of the system, as previously described, is used to determine a time of flight for the spatially modulated light as it travels from the spatial light modulator 1310 to the light detector 1320 via the object 1305. This time of flight measurement can be used to determine the straight-line distance 1376 from the spatial light modulator 1310 to the object 1305. Accordingly, a light detection and ranging (LIDAR) system is provided. In embodiments, at least one of a LIDAR emitter (e.g. holographic projector) comprising the spatial light modulator 1310 and a LIDAR receiver comprising the light detector 1320, may be located within a lamp unit or a portable device or vehicle, such as the headlamp unit of a vehicle. The processor 1370 may be located with the LIDAR emitter and/or the LIDAR detector or may be located remotely.

In embodiments, the light source is a laser such as a laser diode, or another light source that provides coherent light. In embodiments, the light detector is a photodetector such as a CCD or SPAD array. In embodiments, there is provided a vehicle comprising the LIDAR system.

In embodiments, the laser light from the light source may be modulated with a code that is unique to the LIDAR system. Such coding may be used in order to avoid interference or confusion with light associated with other LIDAR systems (e.g. within other vehicles on the road). In such embodiments, the LIDAR receiver looks for the coding in received light, and only processes received light modulated with the corresponding code. For example, binary modulation of the light amplitude with a unique binary number pattern may be performed to provide the unique code (e.g. by switching the light source on and off in a predetermined code or pattern). Other types of modulation or encoding of the laser light could be employed.

In some embodiments, two or more light sources may be used. For example, two or more lasers having different wavelengths (e.g. within the IR range) may be included in the LIDAR system, and used at different times to provide light to the SLM. The laser used as the light source, and thus the wavelength of light used for form the light footprint, may be changed according to ambient conditions, such as when fog or other adverse weather conditions are detected, to provide improved light penetration.

In embodiments using feedback, the first light footprint (and any other light footprints) of the first survey may be formed of light of a first wavelength and the sequence of light footprints of the second survey may formed of light of a second wavelength. In embodiments, the first and second wavelengths are different colours of visible light. In embodiments, one or both of the first and second wavelengths are different wavelengths of infrared.

As described above, the inventor's previously proposed holographic "scanning LIDAR" system moves a single light footprint across the scene by beam steering, which involves repositioning the replay field, leaving the shape, size and form of the light footprint unchanged. The present disclosure proposes a holographic LIDAR system, in which the replay field is not repositioned by beam steering but the light footprint is changed. In particular the light footprint provides a pattern of structed light, and the pattern of the structured light is changed. In embodiments, the light footprint/structured light comprises a pattern of a plurality of light spots or "sub footprints" and the pattern is changed (e.g. shape or position of sub footprints within the light footprint is changed) to illuminate the replay plane differently and thus derive different information from the scene.

The holographic LIDAR system of the present disclosure may be combined with aspects of the previously proposed holographic "scanning LIDAR" system based on application requirements. For example, after a scan or survey of a replay field (array of IFOVs) as described herein, the replay field may be repositioned by beam steering and the scan or survey may be repeated for the new replay field (array of IFOVs). For example, the replay field may be repositioned to an adjacent array of IFOVs within the scene and a scan or survey performed for the repositioned replay field. The process may be repeated for adjacent replay fields in order to survey the whole of the scene or any desired area thereof.

The holographic LIDAR system of the present disclosure may be used for scanning or surveying different distance ranges. In embodiments, the holographic controller of the LIDAR system may provide different temporal sequences of holograms to the SLM as described herein for scanning or surveying the scene for respective distance ranges. In particular, the holographic data provided to the SLM may be determined so that the light footprint is focused at a replay plane corresponding to the required distance or range (e.g. by adjusting the lensing function corresponding to a Fourier transform lens used to reconstruct the computer-generated hologram or by changing the corresponding lensing data within the data, as described above). In other embodiments, a physical Fourier transform lens may be selected to focus the light footprint at a replay plane corresponding the required distance or range. Thus, in embodiments, it may be said that the light footprint, or a parameter or element associated with the plurality of computer-generated holograms that form the light footprint, is determined based on a distance range. In particular, the determination is such that the light footprint is focused at a distance corresponding to the distance range.

The appropriate lensing function/data for a particular range may be determined in response to a range selection signal. For example, a range selection signal may be provided manually by a user, or automatically when a predetermined condition is detected. The selection of the range may be based on vehicle speed, density of traffic or other driving factors or conditions. Selection of a longer range scan may be preferred when the vehicle is traveling at higher speed. For example, a long range may be preferred for motorway driving and a short range may be preferred for city driving in dense traffic. Thus, in embodiments, the distance range is selected based on a received signal. In embodiments the distance range is determined based on at least one of: vehicle speed; ambient conditions; weather conditions; traffic conditions and other driving parameters.

The holographic LIDAR system of the present disclosure may be used together with the inventor's previously proposed "interleaved scanning". In particular, first and second interleaved scans or surveys may relate to the same or different areas of the scene. As described herein, scanning or surveying the same area (e.g. a replay field or sub area of a replay field) of the scene concurrently using different light footprints (e.g. a light footprint of the first scan/survey corresponding to coarse or low resolution scan and a light footprint of the second scan/survey corresponding to a fine or high resolution scan) may provide different information about the area of the scene. Scanning different areas of the scene concurrently using the same or different light footprints can obtain information about the different areas of the scene. Since the first and second scans are interleaved, and therefore performed concurrently, the information captured by both scans relates to the scene at substantially the same point in time.

In embodiments in which the light footprint comprises structured light, such as the embodiment of FIG. 5C described above, a first sequence of frames forming light footprints comprising structured light having a first pattern (e.g., shape, form and/or pattern) constituting a first scan/survey may be interleaved with a second sequence of frames forming light footprints comprising structured light having a second pattern (e.g., shape, form and/or pattern) constituting a second scan/survey. The interleaved first and second sequences of frames/footprints may be repeated in different areas (replay fields) of the scene, corresponding to different arrays of IFOVs within the scene. In implementations of such embodiments, an array detector 420 as shown in FIG. 4, such as a low resolution SPAD array or the like, may be used to optimise parameters such as scanning time, quality and/or resolution of the scan etc., according to application requirements, as described above.

In accordance with embodiments, a first scan/survey may comprise a stochastic scan, which projects a light footprint (e.g. as in the embodiment of FIG. 5A) that is moved randomly around the scene (e.g. to different areas around a vehicle). When a feature within the scene is identified from the stochastic scan (e.g., from a light response signal in response to the first scan) or otherwise, a second scan/survey of an area including the identified feature may be performed (e.g. at higher resolution as in the embodiments of FIG. 5B, 5C or 6 to 8). In embodiments, the stochastic scan is continuous, and one or more second (e.g. higher resolution) scans/surveys are interleaved with the stochastic scan. In particular, high resolution second scans/surveys may be performed concurrently with the stochastic scan. Thus, the stochastic scan may be performed continuously, and second scans/surveys of limited duration may be introduced, interleaved into the stochastic scan, as necessary. For example, a second, high resolution scan/survey of a particular area may be added, interleaved with the stochastic scan, when a feature is detected within the area, and then removed when the high-resolution scan/survey is complete. Thus, new targets are continually identified by the continuous stochastic scan, and further detail of such identified targets are subsequently obtained by the second scans/surveys. In alternative embodiments, the second scan/survey may be performed instead of the stochastic scan (i.e., the first and second scans are not concurrent). In this case, scanning alternates between the first and second scans.

The quality of the holographic reconstruction may be affected by the so-called zero order problem, which is a consequence of the diffractive nature of using a pixelated spatial light modulator. Such zero order light can be regarded as "noise" and includes for example specularly reflected light (i.e. undiffracted light), and other unwanted light from the SLM.

In the example of Fourier holography, this "noise" is focused at the focal point of the Fourier lens leading to a bright spot at the centre of the holographic reconstruction, known as the "DC spot". The zero order light may be simply blocked out, however this would mean replacing the bright spot with a dark spot. Embodiments include an angularly selective filter to remove only the collimated rays of the zero order. Embodiments also include the method of managing the zero-order described in European patent 2,030,072 which is hereby incorporated in its entirety by reference. In other embodiments, the spatial light modulator is illuminated with diverging light such that the diffracted light formed the light footprint is brought to a focus at the replay plane but the zero order light (which is not diffracted) continues diverging. The zero order light is therefore effectively dispersed.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e. the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

The holographic reconstruction is created within the zeroth diffraction order of the overall window defined by the spatial light modulator. In some embodiments, the first and subsequent orders are displaced far enough so as not to overlap with the image and so that they may be blocked using a spatial filter.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A light detection and ranging, "LIDAR", system arranged to survey a scene, the system comprising:
   a light source arranged to output light having a first characteristic;
   a spatial light modulator, "SLM", arranged to receive the light from the light source and output spatially-modulated light in accordance with computer-generated holograms displayed on the spatial light modulator;
   a holographic controller arranged to output a plurality of computer-generated holograms to the spatial light modulator, wherein each computer-generated hologram is arranged to form structured light having a corresponding pattern in a replay field within the scene, and the holographic controller is further arranged to change the pattern of the structured light formed in the replay field by at least one of the plurality of computer-generated holograms;
   a light detector arranged to receive light having the first characteristic from the scene and output a light response signal, wherein the light detector comprises an array of light detecting elements, and
   an optical system associated with the array of light detecting elements, the optical system arranged such that each light detecting element receives light having the first characteristic from a respective sub-area of the replay field within the scene;
   wherein the optical system is arranged so that the each light detecting element of the array of light detecting elements is arranged to detect light reflected from an individual field of view, "IFOV", of an array of individual fields of view, "IFOVs", wherein the array of IFOVs corresponds to the replay field within the scene, and
   wherein the structured light formed by at least one computer-generated hologram of the plurality of computer-generated holograms is a pattern comprising a plurality of discrete light spots having a selected distribution, shape and brightness, wherein the light spots are spatially separated from each other and each light spot is arranged to illuminate a corresponding IFOV within the scene.

2. A LIDAR system as claimed in claim 1 wherein the pattern of the structured light comprises the form, shape and/or pattern of light and light features within the area of the structured light.

3. A LIDAR system as claimed in claim 1 wherein the plurality of computer-generated holograms is output to the SLM in a sequence.

4. A LIDAR system as claimed in claim 3 wherein the plurality of computer-generated holograms comprises a first computer-generated hologram and a second-computer generated hologram and wherein the pattern of the structured light formed in the replay field by the first computer-generated hologram is different from the pattern of the structured light formed in the replay field by the second computer-generated hologram.

5. A LIDAR system as claimed in claim 1 wherein each light detecting element is arranged to output a respective light response signal for the corresponding IFOV.

6. A LIDAR system as claimed in claim 1 wherein the plurality of discrete lights spots comprises an array of light spots, wherein the number of lights spots corresponds to a number of IFOVs in the array of IFOVs within the scene so that every IFOV is illuminated at the same time.

7. A LIDAR system as claimed in claim 1 wherein the plurality of discrete light spots is arranged in a pattern or an array so as to illuminate a first subset of IFOVs in the array of IFOVs within the scene, wherein the number of lights spots is less than a number of IFOVs in the array of IFOVs within the scene.

8. A LIDAR system as claimed in claim 7 wherein the array of IFOVs comprises an array of rows and columns of IFOVs, wherein a light spot is located at every nth position within each row or column of the array, where n is an integer greater than 1, and wherein the light spots in adjacent rows or columns in the array are offset with respect to each other.

9. A LIDAR system as claimed in claim 7 wherein the holographic controller is arranged to reposition at least one of the light spots in the array of the structured light formed by the at least one computer-generated hologram to provide a plurality of discrete light spots in a different pattern in the array in the structured light formed by at least one other computer-generated hologram so as to illuminate a second subset of IFOVs in the array of IFOV within the scene, wherein the first subset is different from the second subset.

10. A LIDAR system as claimed in claim 1 wherein the holographic controller is arranged to change the shape of at least one light spot in the plurality of light spots of the structured light formed by the at least one computer-generated hologram to provide at least on light spot of a different shape in the structured light formed by at least one other computer-generated hologram.

11. A LIDAR system as claimed in claim 1 wherein each computer-generated hologram is arranged to form a light footprint comprising the structured light, wherein the light footprint formed by a first computer-generated hologram in a sequence provides a sub footprint at a first position within an IFOV within the scene, and the holographic controller is arranged to reposition the sub footprint within the IFOV provided by each successive hologram in the sequence.

12. A LIDAR system as claimed in claim 11 wherein one or more of:
- the sub footprint comprises a discrete area of light having a one dimensional or two dimensional shape;
- the sequence of computer-generated holograms output by the holographic controller moves the sub footprint to a plurality of different positions within the IFOV to scan the complete area thereof wherein optionally the light footprint formed by each computer-generated hologram in the sequence of computer-generated holograms that repositions the sub footprint to a plurality of different positions within the IFOV comprises one or more additional sub footprints to selectively illuminate positions within at least one other IFOV of the array of IFOVs within the scene; and
- the IFOV is selected based on feedback received in response to prior illumination of the IFOV by a light footprint.

13. A LIDAR system as claimed in claim 1 wherein there is a one to one correlation between each light sensing element of the array of light sensing elements and an IFOV of the array of IFOVs within the scene.

14. A LIDAR system as claimed in claim 1 wherein the light detector comprises:
- an array of charge coupled device, "CCD", elements, or
- an array of low resolution light detecting elements, such as an array of single-photon avalanche diode, "SPAD", light-detecting elements.

15. A LIDAR system as claimed in claim 1 further comprising a processor arranged to determine a distance of an object in the scene from the LIDAR system by performing a time of flight measurement comprising a time difference between output of first spatially-modulated light, corresponding to a first computer-generated hologram of the plurality of computer-generated holograms, and detection of first spatially-modulated light reflected from the object.

16. A LIDAR system as claimed in claim 1 wherein at least one of the SLM and the light detector is located within a lamp unit of a portable device or vehicle.

17. A lamp unit comprising the LIDAR system of claim 1.

18. A vehicle comprising the LIDAR system of claim 1.

19. A method for surveying a scene, the method comprising:
- providing output light having a first characteristic from a light source;
- receiving the output light from the light source at a spatial light modulator, "SLM", arranged to receive the light from the light source;
- providing a sequence of computer-generated holograms to the spatial light modulator;
- displaying the sequence of computer-generated holograms on the spatial light modulator;
- spatially-modulating with the SLM the output light from the light source in accordance with the computer-generated holograms displayed on the SLM, thereby outputting spatially-modulated light from the SLM to the scene, wherein each computer-generated hologram forms structured light having a corresponding pattern in a replay field within the scene; and
- receiving light having the first characteristic from the scene at a light detector, the light detector outputting a light response signal, wherein the light detector comprises an array of light detecting elements, the light being received at the light detector through an optical system associated with the array of light detecting elements, the optical system causing each light detecting element to receive light having the first characteristic from a respective sub-area of the replay field within the scene,
- wherein the optical system is arranged so that the each light detecting element of the array of light detecting elements is arranged to detect light reflected from an individual field of view, "IFOV", of an array of individual fields of view, "IFOVs", wherein the array of IFOVs corresponds to the replay field within the scene;
- wherein the structured light formed by at least one computer-generated hologram of the plurality of computer-generated holograms is a pattern comprising a plurality of discrete light spots having a selected distribution, shape and brightness, wherein the light spots are spatially separated from each other and each light spot is arranged to illuminate a corresponding IFOV within the scene;
- wherein the holographic controller changes the pattern of the structured light formed in the replay field by at least one of the plurality of computer-generated holograms.

20. A LIDAR system as claimed in claim 8 wherein the plurality of discrete light spots is arranged in a checkerboard pattern.

* * * * *